(12) United States Patent
Rao et al.

(10) Patent No.: US 10,777,094 B1
(45) Date of Patent: Sep. 15, 2020

(54) WIRELESS DEVICES AND INTELLIGENT GLASSES WITH REAL-TIME TRACKING AND NETWORK CONNECTIVITY

(71) Applicants: Sanjay K Rao, Palo Alto, CA (US); Sunil K Rao, Palo Alto, CA (US); Rekha K Rao, Palo Alto, CA (US)

(72) Inventors: Sanjay K Rao, Palo Alto, CA (US); Sunil K Rao, Palo Alto, CA (US); Rekha K Rao, Palo Alto, CA (US)

( * ) Notice: Subject to any disclaimer, the term of this patent is extended or adjusted under 35 U.S.C. 154(b) by 0 days.

(21) Appl. No.: 15/856,372

(22) Filed: Dec. 28, 2017

Related U.S. Application Data

(63) Continuation of application No. 14/629,467, filed on Feb. 23, 2015, now Pat. No. 9,870,716, which is a continuation-in-part of application No. 13/751,049, filed on Jan. 26, 2013, now Pat. No. 8,965,460.

(51) Int. Cl.
*G09B 19/00* (2006.01)
*G02B 27/01* (2006.01)
*G09G 5/14* (2006.01)
*G09B 5/06* (2006.01)

(52) U.S. Cl.
CPC ....... *G09B 19/0092* (2013.01); *G02B 27/017* (2013.01); *G09B 5/065* (2013.01); *G09G 5/14* (2013.01); *G02B 2027/0178* (2013.01); *G09G 2370/16* (2013.01)

(58) Field of Classification Search
CPC .............. G09B 19/0092; G02B 27/017; G02B 2027/0178; G09G 5/14; G09G 2370/16
USPC .......................................... 434/127; 455/566
See application file for complete search history.

(56) References Cited

U.S. PATENT DOCUMENTS

| | | | |
|---|---|---|---|
| 8,947,322 B1* | 2/2015 | Chi | G02B 27/017 345/156 |
| 2013/0032634 A1* | 2/2013 | McKirdy | G06F 19/00 235/375 |
| 2015/0012426 A1* | 1/2015 | Purves | G06Q 30/0623 705/41 |
| 2015/0153831 A1* | 6/2015 | Kim | G02B 27/017 345/156 |
| 2015/0168727 A1* | 6/2015 | Qaddoura | G02B 27/0172 345/156 |

* cited by examiner

*Primary Examiner* — Ayodeji O Ayotunde

(57) ABSTRACT

A mobile communication system based on digital content including images and video that may be acquired, processed, and displayed using a plurality of mobile device, smartphones, and tablet computers. The system enables a variety of priority of systems for interactions between the devices including network servers, wearable devices and appliances. The priority of systems includes various wireless communication of data and telephony between devices. The glasses may image a ball such as a football and track its progress in a game. The camera or laser may track the movement of another object such as a finger to determine where the contact was made with the surface of the hand. The mobile device, intelligent electronic glasses, or headset may further provide a speedometer, acceleration, and various other statistics about the movement of the individual.

17 Claims, 33 Drawing Sheets

Modular Design Allows for Switching Between Traditional and Intelligent Glass

Intelligence integrated into frame bars dynamic uses

ACQUISTION, ANALYSIS AND DISPLAY

Each Device is configured under acquisition, analysis, display, and related criteria

Overlays

Displays

Things to Do & Calendar
1. First Appointment
2. Second Appointment
3. Reminders

700

Recording

Workout Routine Today
1. Weights Lift 20lbs
Last Time:
Lifted 15 lbs 3x times

WIRELESS DEVICES AND INTELLIGENT GLASSES WITH REAL-TIME TRACKING AND NETWORK CONNECTIVITY

CROSS REFERENCE TO RELATED APPLICATIONS

The present application is a continuation of co-pending U.S. patent application Ser. No. 14/629,467 filed on Feb. 23, 2015, which is a continuation-in-part of U.S. patent application Ser. No. 13/751,049, filed Jan. 26, 2013, now U.S. Pat. No. 8,965,460; the present application claims priority and incorporates by reference in the entirety the aforementioned patent applications.

ABBREVIATIONS

Intelligent Electronic Glasses is abbreviated as IEG.
Near Field Communication is NFC.

BACKGROUND

Processing, compute, storage, and communication capabilities are often found at traditional endpoints such as mobile devices or cloud networks. There is a need for distributed computing power to be available in a plurality of devices and network enabled devices. The ability to have computing, storage, and communication capabilities distributed via a plurality of local devices and body level devices may be enabled via new wireless device form factors that may be wearable, small, disposable or integrated into larger devices.

The disclosure generally relates to smart glasses, smart watches, smart bands, and other wearable devices that may be used standalone or in conjunction with a mobile device, wireless network, or remote cloud server infrastructure.

SUMMARY

This disclosure generally relates to a plurality of multimodal and multifunction input and output mobile device including intelligent electronic glasses. It is an attribute of the present disclosure to enable mobile devices, advanced smartphones, cellular telephones, tablet computers, smart goggles, intelligent electronic glasses, cameras, smart projectors, smart watches, smart headgear, smart headphones, smart headsets, smart necklaces, smart earrings, and other accessories to provide digital media content acquisition, presentation, and interaction. These mobile device/intelligent electronic glasses/headset may allow for continuous and always-on acquisition of audio, image, video, location, and other content using a plurality of input methods including images sensors. Further, the mobile device/intelligent electronic glasses/headset may display content on a variety of displays and surfaces.

It is an aspect of the present disclosure to enable image based communication between mobile device/intelligent electronic glasses/headset, distributed image sensors, stationary devices, and servers by wired or wireless communication means.

The mobile device/intelligent electronic glasses/headset may enable device or server control including gesture control, eye control, in-air control, retinal control, facial control, and other user interface activities for a variety of electronic devices. In this system, image sensors may be integrated into various mobile devices. Image sensors may also be coupled to a variety of traditional non-electronic devices. As an example, a camera may be integrated into a pair of sunglasses and a display may be affixed to the lens or area proximate to the lens of the glasses. Communication between the mobile devices/intelligent electronic glasses/headset and other devices including Internet or network servers may be completed using wireless transmit and receive radios integrated into the devices.

It is an embodiment in the system to have intelligent electronic glasses or headsets configured to be worn on the body. These intelligent electronic glasses or headsets may be enabled with the full or partial functions previously resident on a smartphone or stationary electronic device. The intelligent electronic glasses may leverage the processing capability of a smartphone or a local or network server and continuously acquire, transmit, and receive digital content.

The intelligent electronic glasses or headset may comprise a full set or subset of these components including: processor; multicore processor; graphics processor; display; high definition display; LCD, LED, see thru LED, see thru mirror display, see thru LCD/LED mirror display or other displays; dual displays for each eye; keyboard; projected keyboard; on screen keyboard; programmable buttons; microphone; noise isolation or noise cancellation; speakerphone; in-ear speaker; digital still camera; digital video camera; front facing camera; back facing camera; side facing camera; eye tracking camera; high definition (HD, 720p, 1020p) camera; light/flash; laser; projector; infrared or proximity sensor; vibration device; LEDs; light sensor; accelerometer; gyroscope; x-y-z positioning; GPS; compass including solid state compass; memory such as flash memory; buffer memory; power sources; battery; rechargeable battery; multiple data and video input and output ports such as audio, ethernet, USB, firewire, 1394, VGA, or HDMI; wireless transmit and receive units such as Bluetooth, WiFi (802.11a,b,c,n,x), Cellular (GSM, Edge, CDMA, others); transmission protocol software such as TCP/IP; one or more antennas including antennas fitted into the frame of the glasses; operating system; software such as image recognition software; access to an software application store; smartphone/tablet, server, cloud, or desktop synchronization software; audio, pictures, and video streaming software; Internet configuration; UI command and control such as gesture control, retinal control, face and expression control; lens; fingerprint resistant lens; replaceable lens; see thru lens; filters; audio and video playback; and various other components. Components may be integrated into ASICs, integrated housing, separated components, or swappable components.

The mobile device may comprise a full set or subset of these components including: processor; multicore processor; graphics processor; display; high definition display; LCD, LED, see thru LED, see thru mirror display, see thru LCD/LED mirror display or other displays; dual displays for each eye; keyboard; projected keyboard; on screen keyboard; programmable buttons; microphone; noise isolation or noise cancellation; speakerphone; in-ear speaker; digital still camera; digital video camera; front facing camera; back facing camera; side facing camera; eye tracking camera; high definition (HD, 720p, 1020p) camera; light/flash; laser; projector; infrared or proximity sensor; vibration device; LEDs; light sensor; accelerometer; gyroscope; x-y-z positioning; GPS; compass including solid state compass; memory such as flash memory; buffer memory; power sources; battery; rechargeable battery; multiple data and video input and output ports such as audio, Ethernet, USB, firewire, 1394, VGA, or HDMI; wireless transmit and receive units such as Bluetooth, WiFi (802.11x), Cellular (GSM, Edge, CDMA, others); transmission protocol software such as TCP/IP; one or more antennas including antennas fitted into the frame of the glasses; operating system; software such as image recognition software; access to an software application store; smartphone/tablet, server, cloud, or desktop synchronization software; audio, pictures, and video streaming software; Internet configuration; UI command and control such as gesture control, retinal control, face and expression control; lens; fingerprint resistant lens; replaceable lens; see thru lens; filters; audio and video playback; and various other components. Components may be housed in various integrated ASICs, integrated housing; separated components, or swappable components.

A watch may comprise a full set or subset of these components including: processor; multicore processor; graphics processor; display; high definition display; LCD, LED, see thru LED, see thru mirror display, see thru LCD/LED mirror display or other displays; dual displays for each eye; keyboard; projected keyboard; on screen keyboard; programmable buttons; microphone; noise isolation or noise cancellation; speakerphone; in-ear speaker; digital still camera; digital video camera; front facing camera; back facing camera; side facing camera; eye tracking camera; high definition (HD, 720p, 1020p) camera; light/flash; laser; projector; infrared or proximity sensor; vibration device; LEDs; light sensor; accelerometer; gyroscope; x-y-z positioning; GPS; compass including solid state compass; memory such as flash memory; buffer memory; power sources; battery; rechargeable battery; multiple data and video input and output ports such as audio, ethernet, USB, firewire, 1394, VGA, or HDMI; wireless transmit and receive units such as Bluetooth, WiFi (802.11x), Cellular (GSM, Edge, CDMA, others); transmission protocol software such as TCP/IP; one or more antennas including antennas fitted into the frame of the glasses; operating system; software such as image recognition software; access to an software application store; smartphone/tablet, server, cloud, or desktop synchronization software; audio, pictures, and video streaming software; Internet configuration; UI command and control such as gesture control, retinal control, face and expression control; audio and video playback; and various other components. Components may be housed in various integrated ASICs, integrated housing; separated components, or swappable components. The watch may function as a second screen or "n-th" screen device for another display such as a smartphone or television.

The cellular telephone, glasses, watch, and other electronic devices may communicate with each other and with local or network servers.

The glasses can be used to take a single picture, a series of pictures, or full motion video, HD video through the use of a camera that is mounted on the housing of the glasses frame or integrated into the lens. In the integrated camera model, the camera electronics may be integrated into the frame of the glasses and the lens of the glasses is used as the lens for the camera. Image and video data can be wirelessly uploaded to a remote server or alternatively stored locally on the glasses.

In another aspect of the invention, the glasses may project text on to a physical object.

In another aspect, the intelligent electronic glasses may record an individual touching of an object and classify the object in a data and the object is connected to various meta-data including location, time of day, temperature, proximity to people and other factors.

In another aspect, the intelligent electronic glasses may present in a first lens an advertising or product purchase placement that is viewed in the second lens.

In another aspect, one lens of the intelligent electronic glasses may display all of the prior history associated with an object, such as how many times that object was touched, whether the product is under warranty or not, what the current price of the product is on a used market, what the price of the product.

In another aspect, the user can access an inventory database consisting of all objects in the room or loaned out to a third party. This information may be displayed on the mobile device including intelligent electronic glasses or watch.

In another aspect, a user can trace whether an object is broken based upon how many times an object was used by that member. As an example, an older child may blame this on the younger child if he is accused of breaking something. A camera may record usage of a device, store the history of this usage, analyze the usage, and present recommended view periods of the potential breaking incident.

In another aspect, one lens can browse the internet and the other lens of the glass can present image, video, or text.

In another aspect, the glasses can change from one tint to another to decrease exposure to the eye.

In another aspect, the glasses have a wireless transmit and receive radio built-into the device for continuous and real-time streaming to a local or network server.

In another aspect, the wire frame may be configured as one or more antennas for one or more wireless radios.

In another aspect, the glasses record conversations and auto playback for repeating conversations and agreements of conversations. This may be useful for auditing of contracts, agreements, or events. Alternatively, it may be useful in recording a person's life events.

In another aspect, dual cameras may be used simultaneously. For example, one camera may take a picture and the other camera may acquire video while a microphone captures audio. Alternatively, multiple cameras may be used simultaneously to provide a 360 degree experience. Alternatively, one camera may be a 3D camera.

In another aspect, the camera may work in conjunction with the specific displays on the mobile device, glasses, or watch. For example, a user may select to activate a rear camera so that it is displayed in the left or right lens.

In another aspect, the camera can provide magnification of content by allowing for a zoom function. This may be useful in experiments and thereby obviate the need for a microscope. It may be useful in the driving context to identify road hazards. It may be useful outside to identify stars, clouds, and other items.

In another aspect, the zoom function is done through interpolation thereby providing optical and digital zoom capabilities.

In another aspect, glasses include a micro-projector so that they can display content on to a hand, wall, or pavement.

In another aspect, the projected content may be obtained in real time from another set of glasses, video, internet site, or stored media on a server.

In another aspect, a first camera on the glasses captures movement and the second glasses captures movement so as to provide a touch like interface without a surface.

Alternatively, a sensor may send a light pulse to gauge the distance between the hand and the projected image so as to identify where contact was made on the projected image.

Alternatively, a sound may sound may be used to detect distance from the hand to the glasses or may be used to track the send and receive of the signal.

Alternatively, a laser may be used to track and identify gestures.

Alternatively, the glasses may leverage the processing power resident on a second device including a cellular phone, watch or other mobile device.

In another aspect, content acquired from the glasses may be displayed on a TV, watch, or mobile phone.

In another aspect, the glasses may include a flash for pictures or a light and may be integrated into the device or be an attachment.

In another aspect, the resolution of the images may be modified using various lenses varying distance between the eye and the lens or other approaches.

Alternatively, a mobile device may be used and may display on the screen images acquired from a separate camera such as those on a pair of glasses where the images are annotated with content acquired from an internet server or local object. In turn each object may broadcast using RFID or other means information about itself to glasses, phones, server, or other devices. This RFID may be a label and can affix it to other devices.

Alternatively, the label may be a bar code or other image. This label may be a physical or virtual label and may include a barcode or other identifier. A table stored on a server or other device may map the label to data about the object. An owner, gifter, seller, or other person or system may create a data table including object location and other meta data, including purchase data, purchase price, ownership, useful life, willingness to sell object at an offer price. The data set may also pull in real time data including current price used on various exchanges. These objects may be automatically placed on an internet auction for immediate sale. A user may set an aspiration price including for family heirlooms. This obviates the need for the owner to manually post these items on an online exchange.

A user may then use their interface component such as glasses or mobile phone to assess the value of all objects within a home or environment.

The camera mounted on the glasses, smartphone, vacuum cleaner, or other robot may automatically scan home environment. For example, a robotic vacuum cleaner of a hotel may constantly scan a room to determine whether any objects are missing. This map of objects and paths may also be posted to an Internet server or database.

In another embodiment, a user may move an virtual object in a display and have the object move in the physical world by a robot. For example, a chef may move virtual images of objects such as a tomato and a robot may move the tomato in the physical world. This may enable remote cooking for elderly people or friends.

In another embodiment, it may be that one eye or multiple eyes may be impaired. The display may alter resolution, magnification, and other factors by lens to compensate for physical deficiencies.

In another aspect, the mobile device/intelligent electronic glasses/headset/watch may be able to convert spoken audio to text in real time and post the information on one or more displays. As an example, a conversation may appear in the left lens of the glasses as a person is speaking. In the right lens, a set of conversation topics or Internet search terms related to the spoken content may appear.

In another aspect, distance may be measured by modifying one lens and another lens to focus on different focal areas.

In another aspect, a camera at the top of the glasses may zoom in on a hands and a projector may display an image of a keyboard so as to allow typing on the air. A laser may be used to track the gestures. Alternatively an inward facing camera may be used to track eye movement to understand the focus areas of the individual and map these focus areas to the gestures or control activities.

In another aspect, eye-tracking may be enabled on a camera focused on an individuals eyes. This camera may be integrated into the intelligent electronic glasses. Alternatively, it may be a second camera on a mobile phone. This may be used to measure advertising effectiveness such as when an individual watches television or when an individual walks down a street and sees billboards.

Alternatively, eye tracking may be used for fatigued drivers and they may measure pupil dilation, eye strain redness and other factors to assess exhaustion and the potential of falling asleep at the wheel. Alternatively, the glasses may measure physiological problems for medical diagnosis such as glaucoma and cataracts.

In another aspect, the glasses may be used for gaming including scavenger hunts or other activities.

In yet another aspect, the mobile device/intelligent electronic glasses/headset may be used to control actions in a different area. As an example, a person may be at the office and wish to control appliances at home. The display may show the inside of the person's house and allow the individual to make gestures such as turn off and on lights in the virtual reality view. These actions and commands may be recorded by mobile device/intelligent electronic glasses/ headset, sent to a server, and in turn sent to a home server or the home device to implement the action. This may allow full home automation and control using the mobile devices/ intelligent electronic glasses/headset from remote locations.

The glasses may be part of a network and allow a first individual to take control of another person's glasses. Glasses may be identified by IP address or another unique numeric or alphanumeric ID. In this instance, a user or system may login to the glasses device, update configurations and software, and change the camera acquisition activities and display. As an example, an individual wearing glasses that enters a retail store, may not find a retail store employee to help with a purchase. The store may allow for virtual retail assistants or avatars that can be activated on the display of the glasses or external display. This may allow for automated sales without the need for people. Other payment mechanisms including RFID, NFC, and cloud based storage of credit card information may be used to allow for immediate purchases of products.

In yet another embodiment, digital content may be recorded, streamed, or viewed on a time lapsed basis.

In yet another embodiment, objects and items may be automatically tagged with location, context, purchase, and other related data. For example this may aid a person in identifying where the person left their keys. Information about the last known location of the keys may be automatically recorded by the camera or tagged by the device. This content may be indexed and searched. Alternatively, it may allow a person to run a search query such as identifying all the items in house that were touched.

In yet another embodiment, various statistical, behavioral, and predictive models may be built based on the large or big data obtained from the input devices. As an example, a prediction function may suggest to a concerned family member the likely activities of a relative. Alternatively, a prediction may be made by a server on which types of people tend to look at certain objects and which types tend to ignore certain objects. This could be helpful for a real-estate ad-network.

In yet another object, the mobile device/intelligent electronic glasses/headsets and distributed camera arrays may be used as a security system. Multiple people may opt their devices into a centralized sharing server that may be searched and used for various predictions. This may be helpful in identifying erratic behavior.

In yet another embodiment, various micro-expressions and emotions may be detected by the facial expressions of a person.

In yet another embodiment, a camera may perform lip reading to understand spoken words when audio is not available. This may enable a person wearing intelligent electronic glasses to read the lips of a person far across a room.

Example: Variants of Glasses

In yet another embodiment, the glasses may be manufactured with various versions that account for design, cost, weight, brand, and other factors. One variant of the glasses may include a full helmet or goggles which provide a housing to encompass additional processors, memory, wireless radios, antennas, cameras, GPS, multiple displays, microphone, speakerphone, and battery. Another version off the glasses may only require a low-power processor, battery, memory, camera, Bluetooth, and WiFi radio without a display. Yet another version may be sold with a display. Other versions may be sold with various protocols.

In another embodiment, multiple displays may be provided targeted at both the left and the right eye.

In yet another embodiment, the lens may be split into a multiple areas, where one area may comprise an display, such as an LCD display, and a second area may be clear to provide traditional viewing. In one instance this may be a bifocal lens where one area of the lens is an electronic display and another area of the lens is a traditional non-electronic lens.

In another embodiment, the device may include an over the ear clip, microphone, in-ear speaker, battery, and display configured to wrap around the forehead and positioned in front of the left or right eye. This item may include a rotatable hinge located above the over the ear component to allow for the display in front of the eye to be moved up or down. It is anticipated that the electronics including sensors and memory will continue to improve in efficiency and capabilities so as to increase the features offered in a smaller lighter package.

In yet another aspect, the functions of the glasses may also integrated into earnings, headsets and necklaces. These devices may be configured with one or more antennas, one or more wireless or wired transmit and receive radios, one or more processors, one or more buttons, one or more cameras, one or more lasers, one or more microphones, one or more speakerphones, one or more touch or non-touch screen displays, a miniaturized projector, battery, and power input and output.

In another variation of the glasses, the glasses may be configured with multiple cameras including a front facing camera and a back-facing camera.

In another variation of the system is for the glasses to be configured with replaceable frames and lenses. It is another variation for the lenses to be configured with varying levels of polarization. The polarized may enable the frames to reduce glare. These polarized lens may have a variety of filters associated with them. The filters may be integrated into the lens. Alternatively, the frames may be equipped with several lenses that may be attached to the device simultaneously. A lens may be moved from an active position and rotated 90 degrees up to an inactive position. Alternatively, a lens may be configured with multiple filters.

In yet another embodiment, a contact lens may be configured into an electronic contact lens enabled with a display, transmit and receive component, antenna, and micro battery. The battery may be charged or the lens transmission may be powered by natural fluid movement in the eye or by blinking the eye.

In another variation of the glasses, the polarization may be modified by physical replacement of the lens. The glasses may provide an easy pop-in and pop out of the lenses. Alternatively the frame may also be easily replaceable, where the side frames of the glasses may be affixed to the center frame of the glasses using screws or clips.

In another variation of the glasses, the polarization may be modified by a physical dial on the glasses. Alternatively, the polarization may be modified automatically using a light sensor integrated into the glasses, a CT/MD, a watch, or other proximate or remote device.

In another variation of the glasses, the polarization may be modified by a cellular telephone or mobile device. An application configured to run on the cellular telephone or mobile device may present various settings to the control the glasses. The application may provide various configuration settings for a user to manage their glasses. As an example, the application may provide a calibration setting where the CT/MD, glasses, watch, or other device captures the ambient light including wavelengths, and appropriate determines a filter to apply to the glasses.

In yet another embodiment of the lenses, the may be configured with anti-reflective lens or progressive lens and other glare reduction means.

In yet another embodiment, the lens may be include prescription lens or sunglass lens.

In yet another embodiment, the lenses may be configured with a wide field of view.

In yet another embodiment, reflected light may be removed when displayed.

Example: Glasses for Physical Activities and Sports

It is another aspect, the system may allow for a user to be able to define the activity that is currently being performed and match the filter on the glasses to the activity. As an example, an individual that is playing tennis may desire for the filter to provide more clarity on a yellow tennis ball and the white markings on the court.

In yet another variation the mobile device/intelligent electronic glasses/headset may be enabled with training specific software. A laser configured on the housing of the glasses, headband, necklace or other external device may be used to assess the speed of objects or people. A laser on the glasses may target a tennis ball. A camera may image the tennis ball. A specialized miniaturized radio transmitter and receiver such as a radar gun including various radar forms could be used to determine the speed of the ball by transmitting a signal focused on the object, measuring the return signal, and calculating the frequency of the signal. The data captured associated with the device may be processed in real time by a local device or a remote server to predict the movement of the object. The predicted position of the object may be used to allow an individual more time to react to the object. For example, the tennis ball may be shown in glasses in a virtual representation as being closer to the individual than in the physical world so that a user may react more quickly to the ball if the user is shown to be responding slow to the tennis balls. Alternatively, the perception may be a calibration setting that can be configured on the glasses, a CT/MD, or a server. The speed of the ball may be displayed on the glasses, a CT/MD, posted to an Internet web page, or stored on a server.

In yet another embodiment, the mobile device/intelligent electronic glasses/headset may also be used in other sports such as golf In this embodiment, a camera may image the golf ball, stroke, and distance of the ball from the tee.

Alternatively, the mobile device/intelligent electronic glasses/headset may be used in a football context where the ball may be measured for the appropriate spin, speed, and distance. In yet another embodiment, a biker may use the mobile device/intelligent electronic glasses/headset while biking on city streets or through nature. In this embodiment, the glasses may identify cars around the biker. The mobile device/intelligent electronic glasses/headset may further provide a speedometer, acceleration, and various other statistics about the movement of the individual.

Example: Transportation and Glasses in Moving Vehicles

In yet another variation, the intelligent electronic glasses may be used in a car. The glasses may image the cars in front, on the side and/or behind the vehicle that an individual is presently in. The glasses may send the data to the CT/MD for further processing, a watch, wireless processor enabled necklace, server located in the car, or a remote server. The glasses may acquire the images of the vehicles in close proximity to the current vehicle, measure the speed of the neighboring vehicles, and track the trajectory of the vehicle. If a vehicle is moving closer than predicted by the system to the present user, the glasses may present a warning indicator on the screen of the classes; a spoken audio through the speakerphone of the CT/MD or car; a vibration of the phone or the glasses. A camera may further be integrated a car vehicle on the top and/or sides of the car. These images may further be sent to the displays in the car, on the mobile device, or the intelligent electronic glasses/headset.

The glasses when used by a driver may also be a tool to give feedback on the driving experience, potential for road hazards or incorrect driver behavior. The glasses may image the road ahead of the vehicle. The images may highlight potholes, sharp turns, obstructions in the roadway, animals, and other objects. The glasses may send the images acquired using the camera to the CT/MD or server for further processing or the glasses may optionally be configured with a higher end processor to perform some level of processing. The CT/MD may assess the danger of the object such as a pothole and suggest a corrective action to the driver. The corrective action may be a synthesized spoken audio command indicating the action to take or it may be a visual message that appears on the lens of the glasses or projected from the glasses onto the windshield of the car.

In yet another embodiment, the mobile device/intelligent electronic glasses/headset may be enabled with thermal imaging capabilities or with radiation scanner which identifies radiation such as terahertz radiation. This may be used by TSA personnel to scan a person in an airport or by local police to scan individuals in a crowd for illicit objects.

Example: Electronic Earnings, Necklace, and Shoes

In another embodiment, a variety of other items including earrings, necklaces, and shoes may be enabled with electronic components to provide I/O and control. Alternatively, a camera and microphone may be clipped onto a shirt or object to capture images and video.

In another variation, a see thru LED, LCD, or other type of mirror may function as a display.

Example: Location Positioning Using Networks and Cameras

In yet another variation, a camera network may continuously capture data about people, objects, and environmental factors. As an example, a location of an individual may be obtained by a reading from image and facial recognition of an picture obtained from a camera.

In yet another variation, the song and music information may be shown in the display. A song played in a coffee shop may be recognized and the meta information about the song may be shown in the display of the glasses or mobile device.

In yet another embodiment, the mobile device/intelligent electronic glasses/headsets may be used in academic or science environment. This may allow a student to use the camera as a microscope or telescope.

In yet another embodiment, the mobile device/intelligent electronic glasses/headsets may allow for complete video acquisition of an event and then subsequent replay of that event. For example, a person with the camera may record a full 360 immersive show and then allow the show to be replayed on another display in real time or time shifted. As an example, a music concert may be recorded using the mobile device/intelligent electronic glasses and then replayed later. Alternatively, meta data about the songs and the concert may be added in real time. Content may be magnified or zoomed in.

In yet another embodiment, a person wearing the mobile device/intelligent electronic glasses/headset may have a room automatically imaged. In this situation, the people may be recognized either by the spoke audio using voice recognition or facial recognition. A list of all the people and social data about the people may displayed on a screen or the lens of the glasses. The system may further suggest conversation topics for each person in the room.

In yet another embodiment, a person's activities may be automatically posted to a public or private web pages, social network, data storage server, or synchronized across devices.

In yet another embodiment, the mobile device/intelligent electronic glasses/headset may be used to scan and ISBN, QR, barcode, or recognize an image of a product based on the design or label and provide reviews, ratings, comparison shopping data, or other information about the recognized product.

In yet another embodiment, an advertiser may be able to bid on all the advertisements associated with a specific person's view in the intelligent electronic glasses.

In yet another embodiment, a person wearing the glasses may patch in avatars, images, and objects into the environment. As an example, absent family member may be patched in for dinner. The person may be connected to an audio of that individual or pre-recorded messages from the individual. These pre-recorded messages may have been obtained from a database or recorded audio.

In a related embodiment, a camera may scan a person's iris for retinal data and perform a match between the retinal scan and a stored image in a server. The match can identify the location of a user as being proximate to the image sensor that acquired the iris shot. Alternatively, an image or video or related content may be projected on to the retina or displayed in very close proximity to the retina.

In another variation, an accelerometer or pedometer or altimeter integrated into a wearable device, mobile device, smartphone, or cellular phone may measure physical activity including steps taken, distance travelled, and height climbed. This data may be recorded on the mobile device or remote server and graphically displayed in a chart. A CPU or co processor may be used to process the activity data.

BRIEF DESCRIPTION OF FIGURES

FIG. 7 shows a variety of overlay cards that can be positioned on top of the glasses display or on a separate watch.

DETAILED DESCRIPTION OF ILLUSTRATIVE EMBODIMENTS

Figure 1:
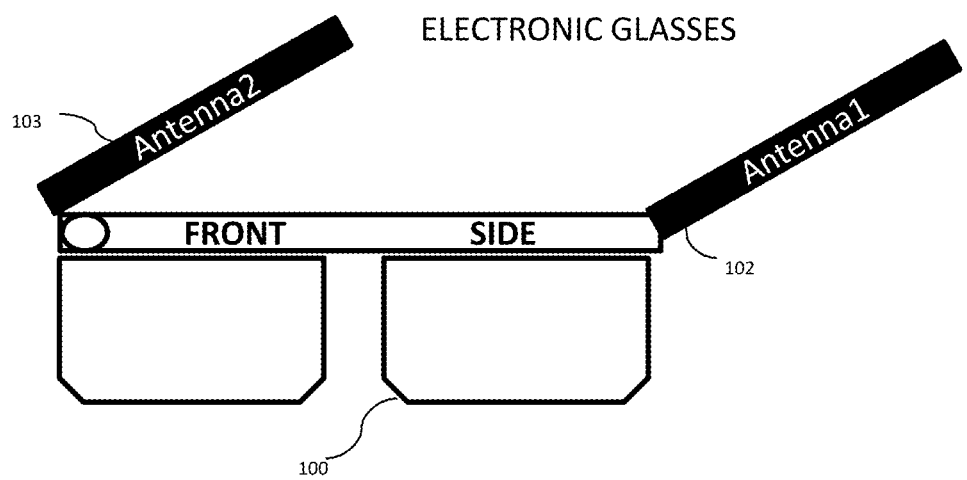
FIG. 1 shows a glass device that includes a plurality of antennas and communication modules and a modular camera device to enable switching between traditional glasses and intelligent glasses.
Figure 1:
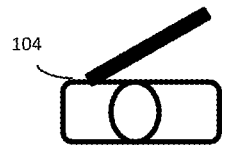

Reference will not be made in detail to the preferred embodiments of the system with examples illustrated in the drawings. It will be understood though that the preferred embodiments are not intended to limit the devices, software, and systems as it is intended to cover alternatives.

Referring now to FIG. 1, a glasses device 100 is enabled with various frame elements 102 and 103. The device may further be enabled with a clip on or moveable module 104 that contains a camera and other mechanism that allows the glasses to alternate in its appearance from traditional glasses like device to a smart like glasses.

Figure 2:
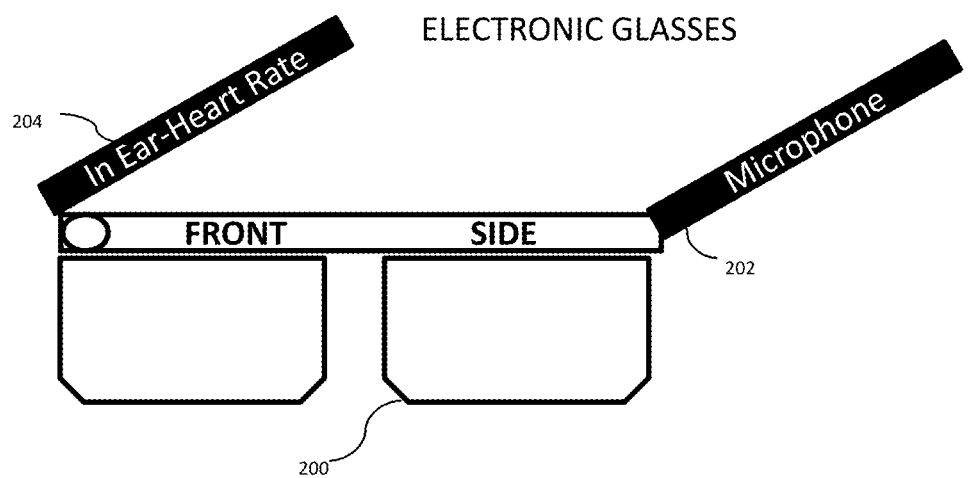
FIG. 2 shows a modular glasses device in which a left frame part and a right frame part may be interchanged in the device with varying amounts of intelligence.

Referring now to FIG. 2, the figure shows a plurality of modular frame elements that may be enabled to upgrade a glasses device 200. In this instance, the intelligence may be enabled in frame elements such as the left and right 202, 204 frame. As an example, an athlete may seek a frame element with an in-ear heart rate reader 204. A person with hearing deficiencies may instead seek a noise cancellation and a speakerphone amplification device.

Figure 3:
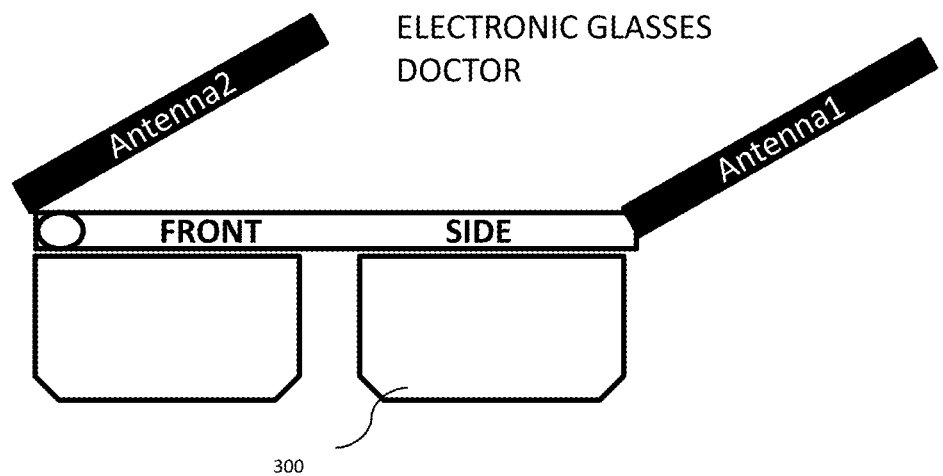
FIG. 3 shows a glasses device that images people to determine one's health and that of others which may be used by physicians and health care workers.
Figure 3:
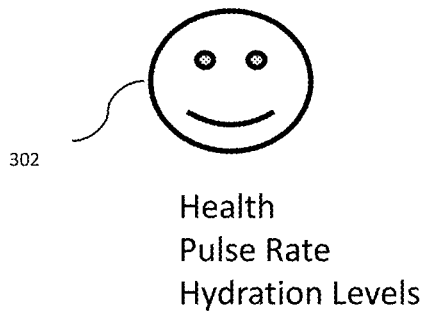

Referring now to FIG. 3, shows a glasses device 300 targeted in the health care domain. In this instance, the device may image various people 302 and assess health factors including hydration rate, skin health such as skin rashes, and pulse rates. This may be determined using image recognition and shining a light source on the skin to determine the rate of blood flow and refractory of the light.

Figure 4:
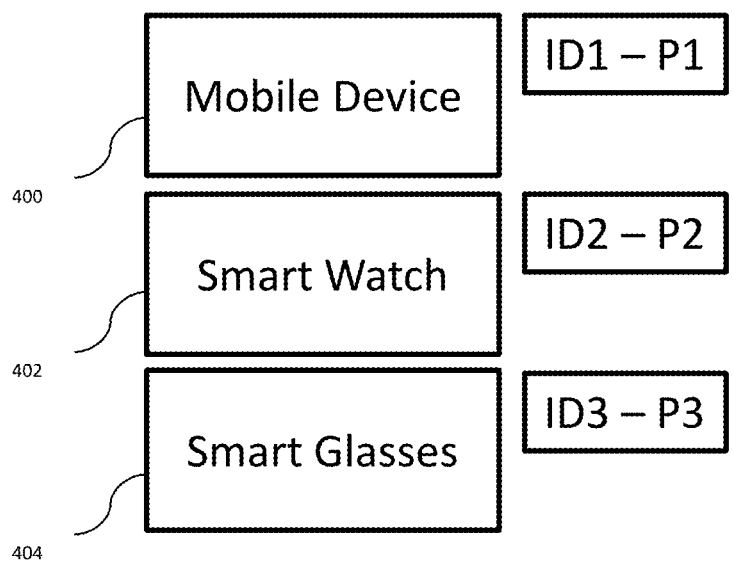
FIG. 4 shows a system in which multiple local devices including a mobile device, smart watch and smart glasses interact across acquisition, analysis and display of information.

Referring now to FIG. 4, the diagram provides a hierarchy of network paths and activities of wearable devices. In this instance a mobile device 400 may tasked as the compute, storage, and communication hub. Meanwhile, a smart watch 402 may be configured as notification and vibration device while a smart glasses device 404 may be configured primarily as a display device. These devices may be associated with varying priority levels.

Figure 5:
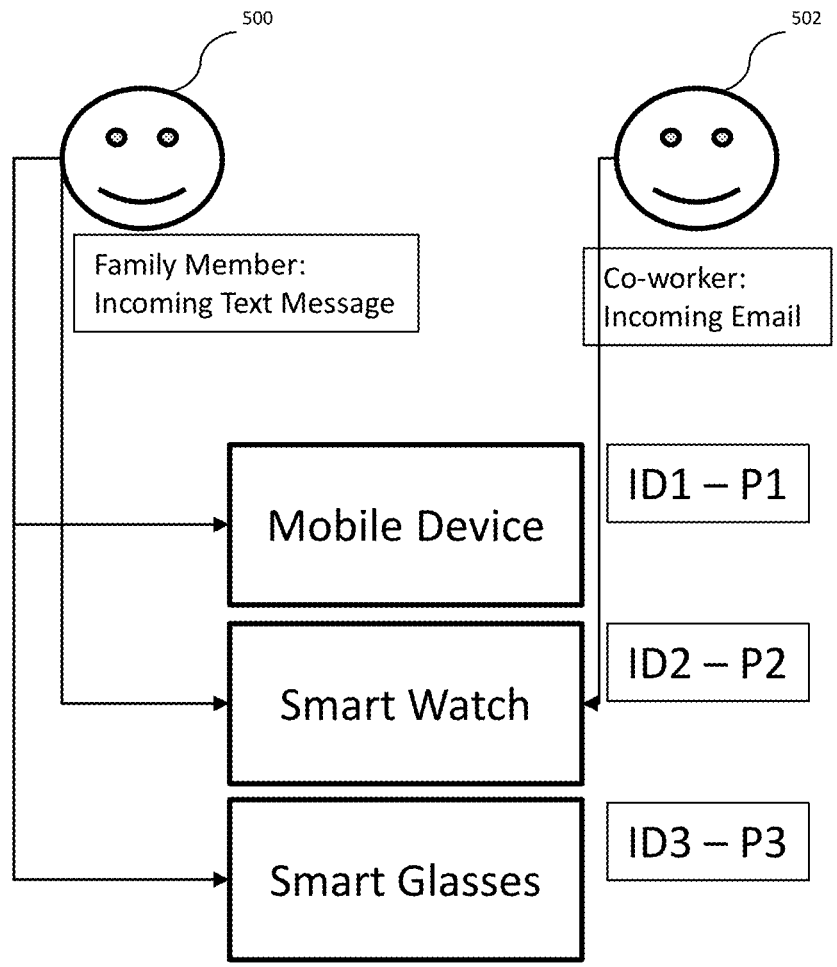
FIG. 5 shows a hierarchy of network paths between the various devices wherein devices are coupled to priority levels and application notifications.

Referring now to FIG. 5, builds upon FIG. 4 and shows how varying contacts may gain access to a person's wearable devices based on their priority levels. As an example, a text message from a family member 500 may display on multiple devices whereas a message from a coworker may only display on a specific work device.

Figure 6:
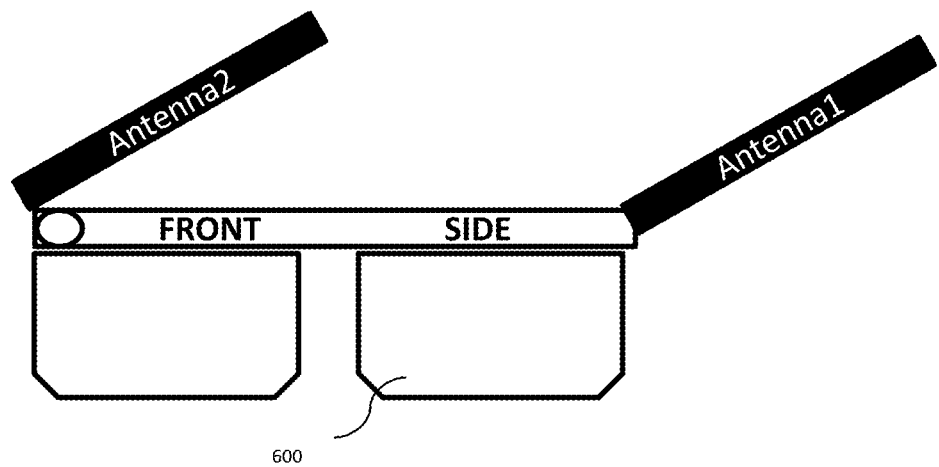
FIG. 6 shows a software application that enables image recognition of people in a public or conference environment.
Figure 6:
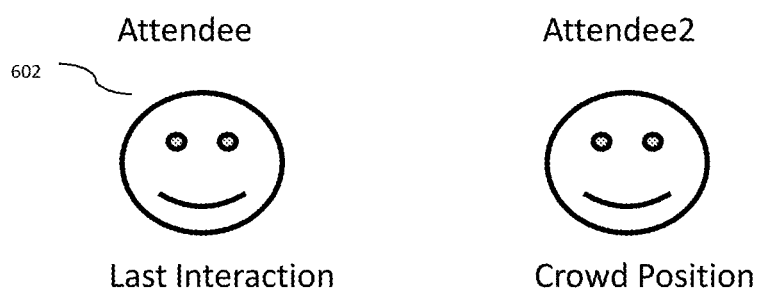

Referring now to FIG. 6, shows the usage of a smart glasses or a camera enabled device 600 including a watch in an event environment. In one embodiment, the smart glasses may be enabled to image people 602 and download related information from social networks and other online networks for display on the glasses enabled device.

Referring now to FIG. 7, shows various examples of overlays 700, 702 that may be displayed on top of glasses.

Figure 8:
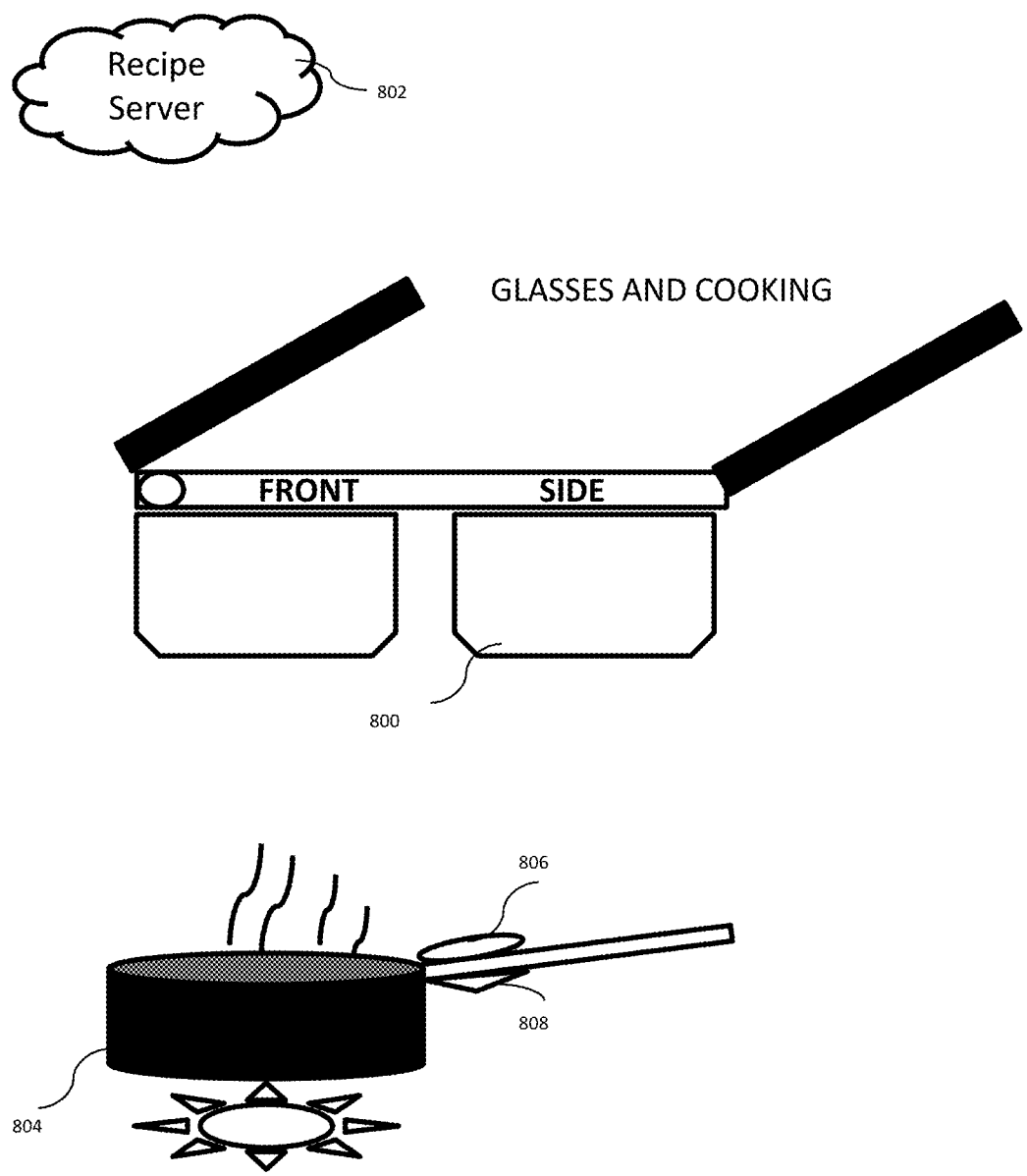
FIG. 8 shows the interaction between a glasses device and a cooking appliance or intelligent pot.

An overlay 700 may display information from calendars or other data sources. Alternatively, an overlay 702 may Referring now to FIG. 8, various examples of the use of smart glasses 800 and wearable devices in the cooking, restaurant, and kitchen environment are provided. In one instance, the smart glasses may download recipes from a cloud based recipe service 802. In one embodiment a picture that you may have been taken at home or at a restaurant or any other place may be stored in a mobile device or any other connected devices and further suggested for consumption for a dinner time preparation. In yet another embodiment, the glasses may be enabled to scan and store the recipe that will be used.

The glasses or mobile device may connect to a recipe exchange in which individuals may charge for their recipes and set prices for a person to buy the full rights or partial rights to the recipe. An appliance such as a 3D printer may be used to enable the production of the recipe.

The glasses device may be coupled to a shopping list application or an inventory management system such that once the recipe is chosen the glasses will display the ingredients you will need, the current inventory, or the ability to place an order for the delivery.

In yet another embodiment, the smart glasses may be enabled such that it can scan a pantry, fridge, or freezer in your kitchen. In turn the glasses can read or scan the label, QR code, bar code, or image recognize the food items and ingredients in the kitchen and store said data in a local or cloud memory.

The glasses or recipe application stored in a non-transitory computer readable medium or other wireless device may suggest various items based on the current availability of ingredients for a chosen recipe. Relatedly, the glasses application may suggest a different recipe based on the ingredients it scans or based on some observed cuisine preferences.

The glasses device may further suggest specific preparation methods including the size the vegetable or meat to be cut, how long an item needs to be thawed or heated, and the appropriate preparation time and cooking time.

Process of Cooking

Glasses display will give instructions to start cooking. As each item is added to the pan, display will change the color as it goes to the next step of the recipe. The cooking pan's handle or the lid could have sensors connected to the glasses which can indicate the amount of time each ingredient needs to cook and will send signal to the glasses in the form of a pleasant bell sound when cooking is done. The sound part could be optional. Glasses then would display the next step until all the steps in the recipe are completed.

The glasses device may further display when a pot 804 is left unattended on the stove if it is about to burn the contents with a loud buzz. The glasses may determine when the stove was turned on based on viewing the start of a flame on the pot and subsequently not viewing the flame being extinguished. In turn the device may suggest to the individual via various notifications to turn off the stove. The pot 804 may be enabled with various displays 806 and sensors 808 to measure cooking time and wireless access.

In yet another embodiment, a novice cook may be enabled via the smart glasses, to ask an expert chef to watch the cooking process from a mobile device such as phone, watch or a mobile device including tablet and give real-time or time lapsed suggestions. This system may further be connected to a delivery system wherein recipes and ingredients and full meals un prepared may be delivered.

In yet another embodiment, the glasses may calculate the calorie and the nutritional values of the food prepared in conjunction with a smart phone app. The glasses may continuously screen the food consumed by an individual and analyze the food content based on the size of the morsel, consistency, transparency, and other factors. This may further enable an individual to keep track of daily calorie intake and nutritional value will help in healthy diet and glasses will help in maintaining a healthy weight management.

In yet another embodiment, the smart glasses may aid when one goes to the grocery store. At the checkout counter the smart glasses can keep track of the items bought and stored in a kitchen pantry. Glasses can indicate if there is enough room in the pantry or fridge to store them.

In yet another instance, the glasses device may be used to directly image products and invoice the customer directly in the grocery store.

Figure 9:
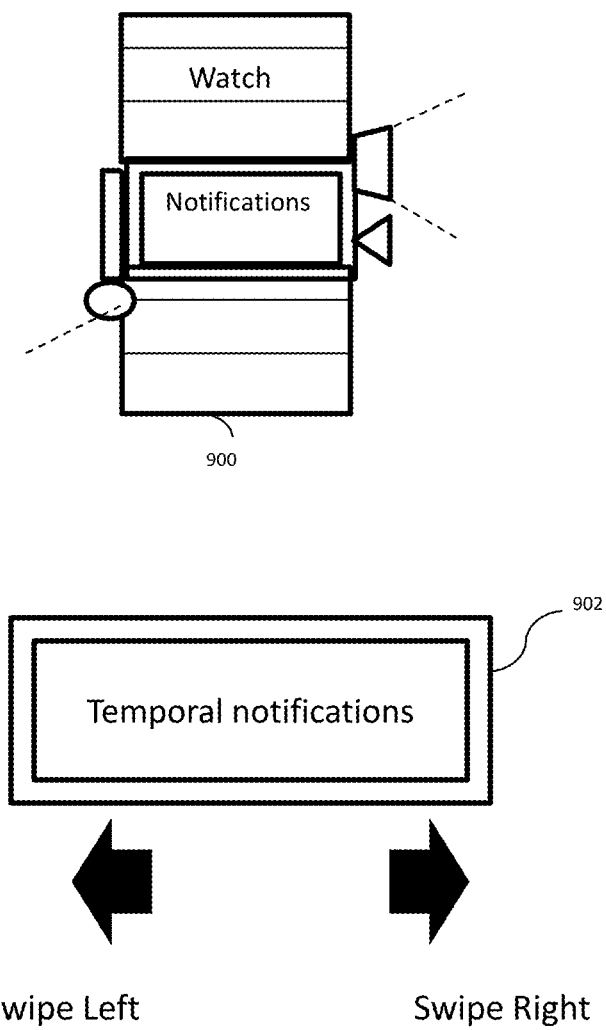
FIG. 9 shows an interaction model in which notifications on a smart watch are displayed and terminated by a variety of gestures.

FIG. 9 illustrates a smart wearable and smart watch device for wear in connection with the skin of an individual. Various notifications may be displayed on the watch device and these notifications 902 may be quickly swiped through via right and left motions.

Figure 10:
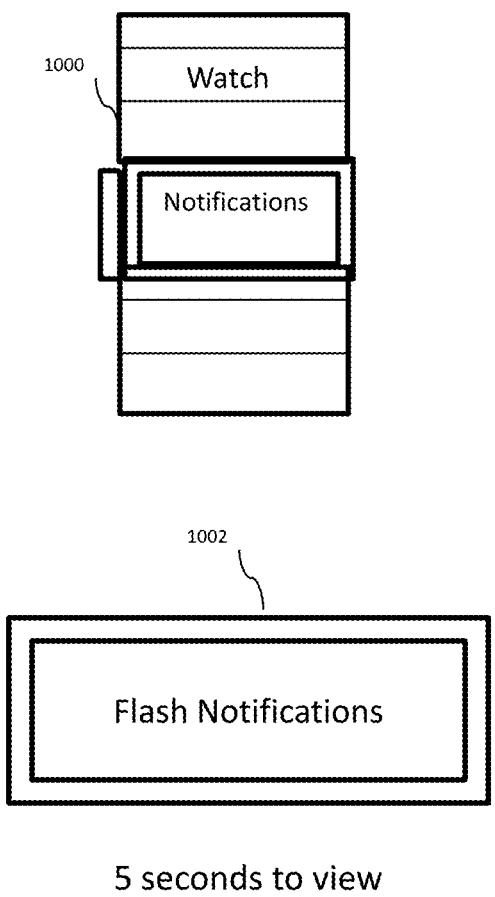
FIG. 10 shows the ability for various notifications to temporally appear on a smart watch device.

FIG. 10 shows a watch 1000 in which notifications are flashed on the device 1002.

Figure 11:
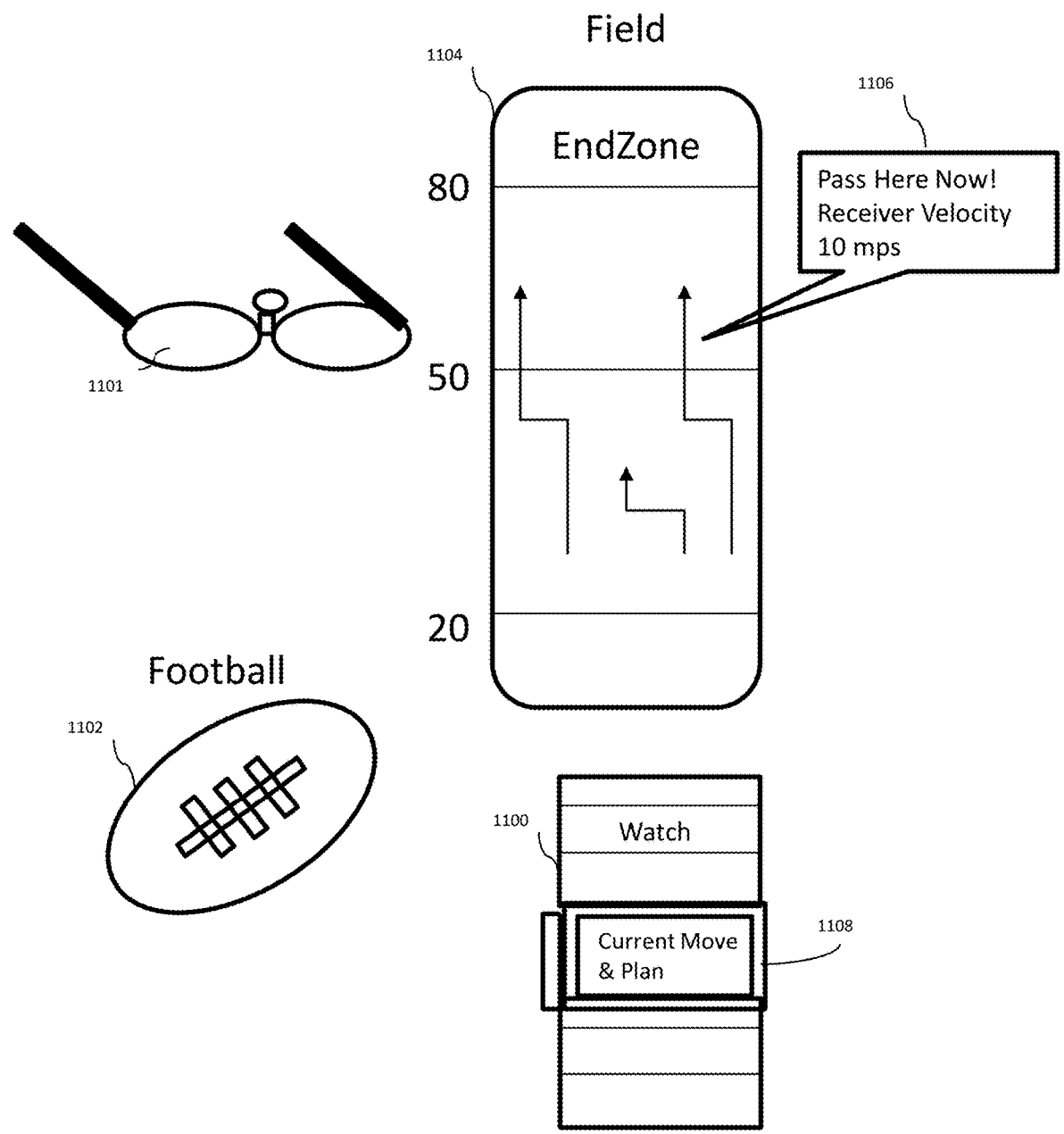
FIG. 11 shows a sports context for the use of smart glasses in which actual routes of players are displayed on the glass and planned routes.

FIG. 11 shows a watch 1100 and a glasses device 1101 in a sports context with various sports equipment 1102. In this instance the glasses may image a ball such as a football 1102 and track its progress in a game. A watch 1100 may display the specific play on the watch device. The smart watch may display feedback to a player based on observed data for or may suggest certain actions 1108 to the player in real time 1106.

Figure 12:
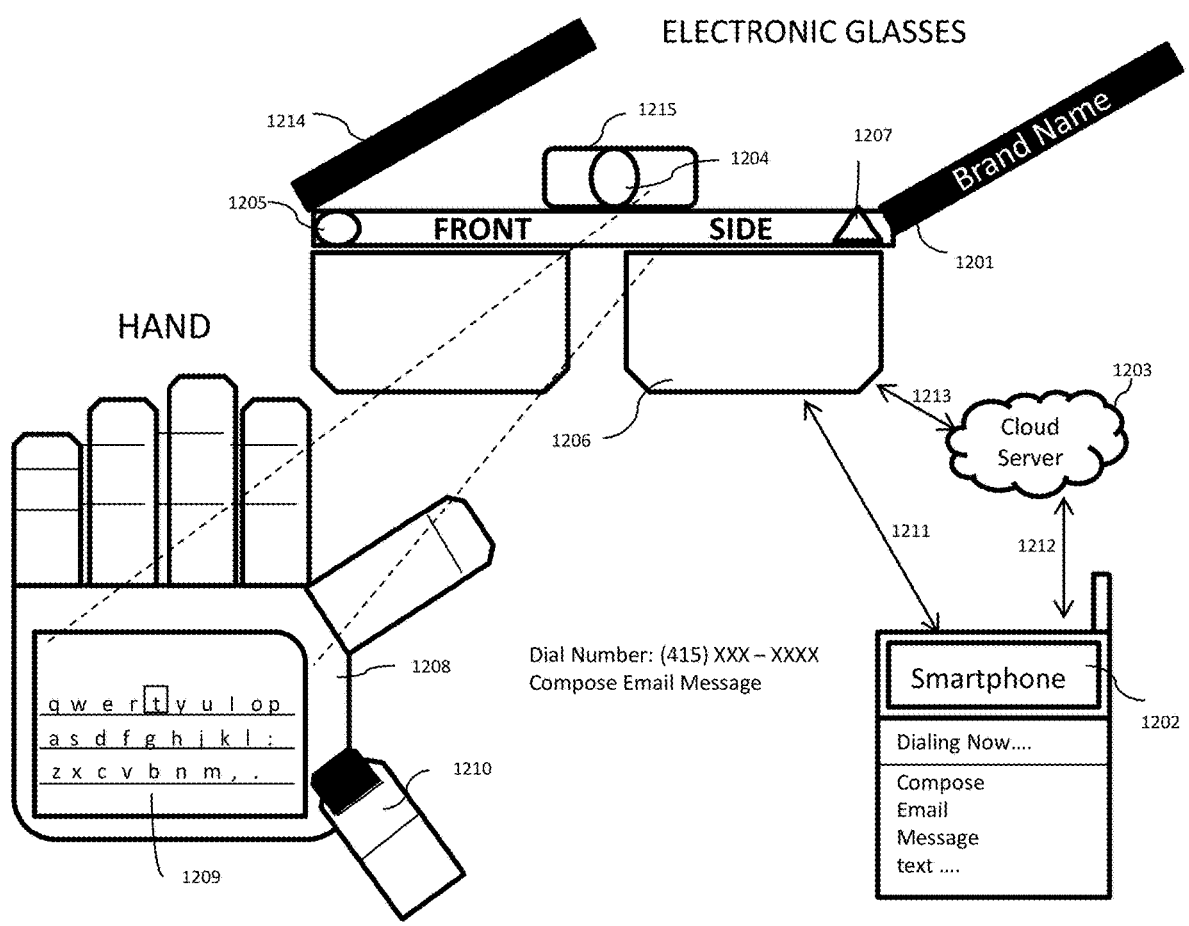
FIG. 12. shows an intelligent electronic glasses and smartphone configured with a camera, laser, and projector in communication with a smartphone. The glasses may project a keyboard onto a hand or surface and allow a user to compose a message on a non-touch surface.

Referring now to FIG. 12, the camera and display may be integrated into an intelligent electronic glasses 1201. The glasses may be in communication a mobile device 1202 and cloud servers 1203 for local or network processing. The glasses may be enabled with a projector 1204, a front facing camera 1205, lens 1206, and laser 1207. The projector 1204 may project an image such as a keyboard or dialpad 1209 on to a surface including a hand 1208. The camera 1205 or laser 1207 may track the movement of another object such as a finger 1210 to determine where the contact was made with the surface of the hand. Multiple communication paths between the devices may be enabled as in 1211, 1212, and 1213 using WiFi access points, Cellular towers, or other communication links. A plurality of antennas 1214 may be integrated into the frame or other aspects of the glasses. Processors, wireless radios, and sensors may be integrated into a common housing built-in or attachable/detachable from the glasses. A display may be added to the housing 1215 that is rotatable and position-able in front of the lens 1206. Alternatively the housing 1215 may be positioned on the side frame and rotated in front of the lens 1206. The glasses may be customized with various frames and brand names. The smartphone 1202 may further provide the same functions as the glasses when integrated with a projector and camera or laser.

Figure 13:
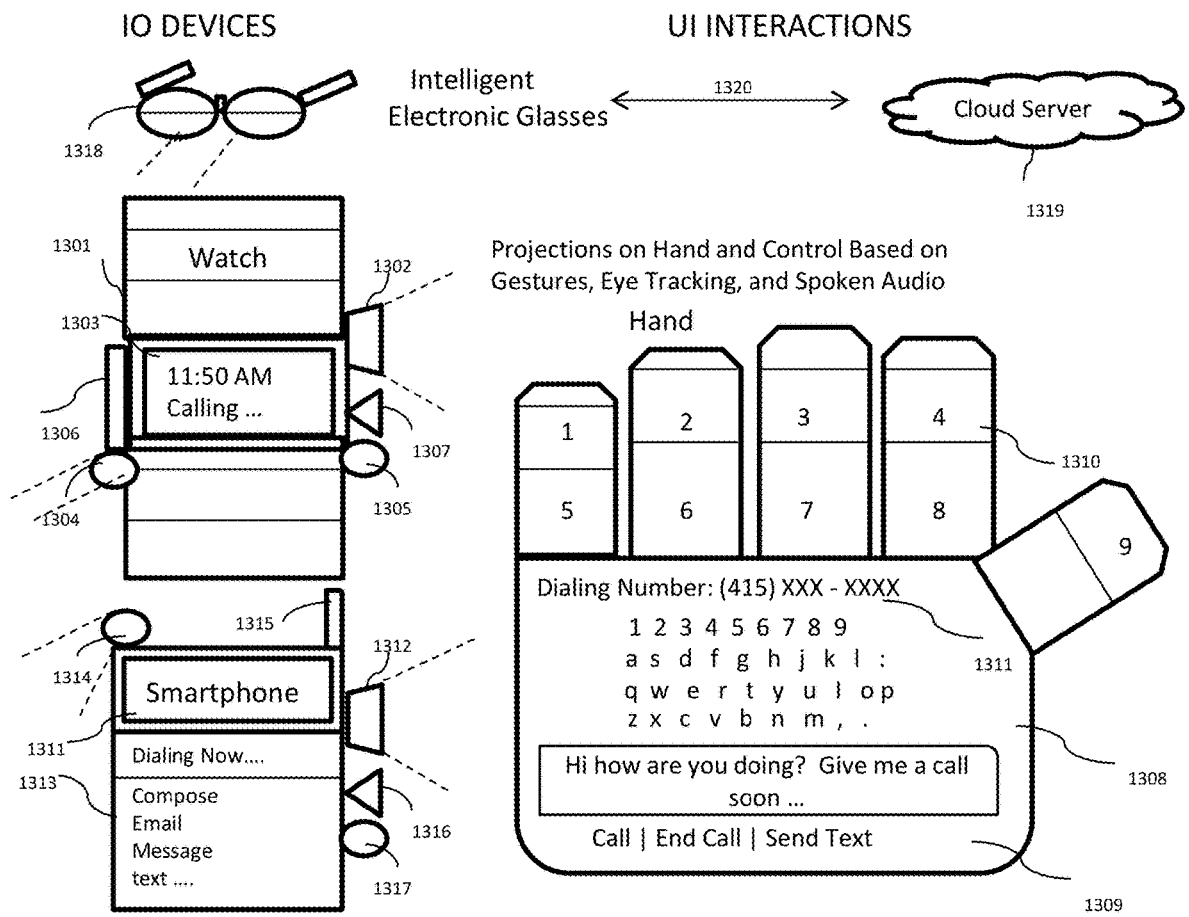
FIG. 13. shows a watch and cellular telephone projecting a keyboard on a hand of an individual. An individual may make contact with the skin or proximate area of the hand to initiate a call.

Referring now to FIG. 13, a watch 1301 with a projector 1302, display 1303, camera 1304, second camera 1305, antenna 1306, laser 1307, and radio may be used to project a keyboard image onto a surface including a hand 1308 and capture interaction with the projected item. Alternatively, a smartphone 1311 with a projector 1312, display 1313, camera 1314, antenna 1315, laser 1316, second camera 1317, and wireless radio may be used to project onto a surface including a hand 1308 and capture interaction with the projected item. The projected items may include keyboards. The projection may be done after recognizing areas of the surface such as the palm 1309 and fingers 1310. The projected characters may be updated as actions are taken on the hand. For example, as digits are entered the telephone number to call may be displayed progressively. A second camera on the device such as 1305, 1317 may be used for eyetracking purposes to further capture the focus area of the eye and map that to the specific coordinates of the projected item on the surface. Multiple cameras or lasers may be used in conjunction to improve the fidelity including components available on intelligent electronic glasses 1318 if available. In addition, the local processing power of proximate devices 1301, 1311, 1318 or cloud based servers 1319 may be used for image recognition. The actions may further result in API calls, two way communication and other data updates between the local devices 1301, 1311, 1318 and servers 1319.

Figure 14:
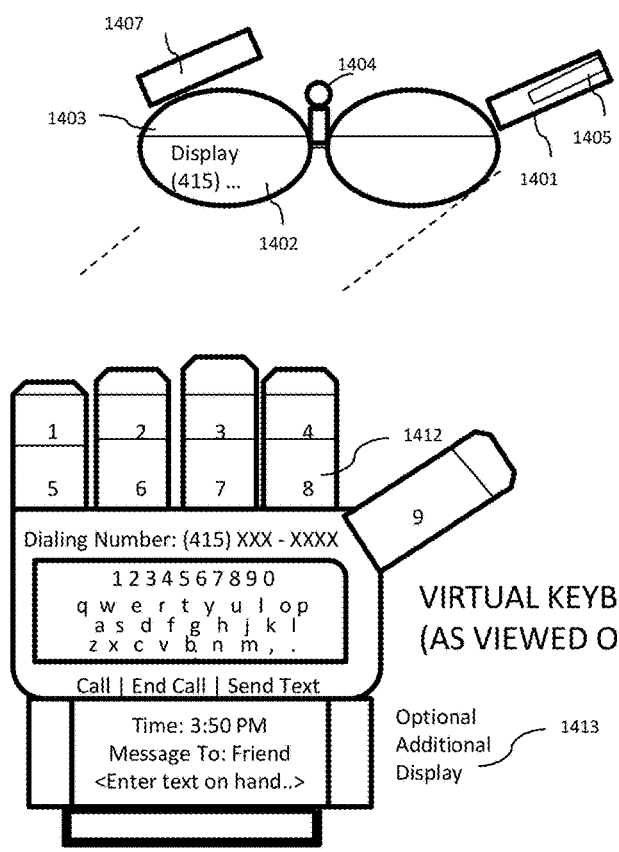
FIG. 14. shows a hand of an individual as viewed through the display of an intelligent electronic glasses or headset. The keyboard may be shown in the display and not actually projected onto the hand, thereby enabling a virtual projection onto the hand in which the keyboard as shown is super-imposed onto the image of hand and viewed through a display. The interaction with this keyboard may be using a finger or pen. The finger or pen movement may be tracked by a camera or laser housed on the mobile device/intelligent electronic glasses/headset. This may enable a private interaction on the hand since the keyboard is only viewable on the display and not on the physical hand.
Figure 14:
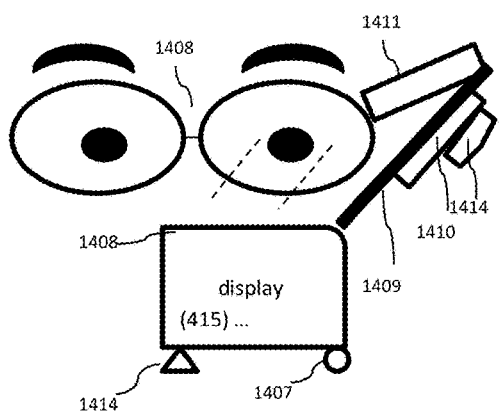

Referring now to FIG. 14, a pair of glasses 1401 is configured with a display 1402 integrated into the lens 1403, a camera 1404, and microphone 1405. The lens 1403 is split in two areas. The top area is a traditional see through glass, a prescription glass, clear plastic, or other material used for lenses. The bottom area 1402 is a display integrated into the lens 1403. This allows an individual to look without obstruction through the top part of the lens and look at digital content in the bottom half of the lens 1402. This bifocal lens, trifocal, or nth-focal lens approach may be in one or both lens. The lens 1403 may be removed from the frame 1407.

A different format for the glasses is displayed in 1408. These glasses have a camera 1407 and a LCD, LED, high zoom, or other type of display 1408. This display may be of varying sizes such as a square 1 inch by 1 inch display, longer widescreen display, or smaller or larger displays. The display 1408 may be fastened to a 1409 band, frame plastic item or another material and further connected to the frame 1411 of the glasses or wrapped around the ear or neck of an individual. The band may contain additional electronics 1410 including a processor, memory, antenna, battery, and wireless transmit and receive radios and control the display 1408. This approach may allow a traditional pair of glasses to be retrofitted with intelligent electronics. Items 1407, 1408, 1409, 1410 may be built-in to the glasses or detachable from the glasses. Alternatively, items 1407, 1408, 1409, 1410 may be used as a headset and without the glasses.

Still referring to FIG. 14, a keyboard, keypad, image, icons, or other items may be virtually placed on to a surface such as a hand. In this instance, the keypad is not physically projected onto the hand. Instead the keyboard is superimposed or placed on top of a surface currently being viewed. In this case, they keyboard or keypad 1412 is superimposed onto a persons hand. Various arrangements may be configured such as placing numbers on specific fingers or placing numbers on the palm. A person may interact with the hand by using a finger or other item, to make contact with the virtual image on a physical hand or virtual hand. The physical hand may be useful to a viewer since it allows the viewer a surface for tactile feedback. However, the physical hand is not needed to type since gestures and contact with the virtual images in the display may serve as a contact or actuation of a specific area. The camera 1407 or a laser 1414 may track the hand movement to appropriate capture the selection of the virtual items. This approach further enables privacy since the actual keyboard is not show. The content may be displayed though on another display such as the miniaturized display 1413 or on a mobile device, smartphone, or remote server. A microphone 1414 may continuous capture sound that is recorded in the memory or streamed to a remote server. A speaker may be positioned in the ear and/or external to the headset.

Figure 15:
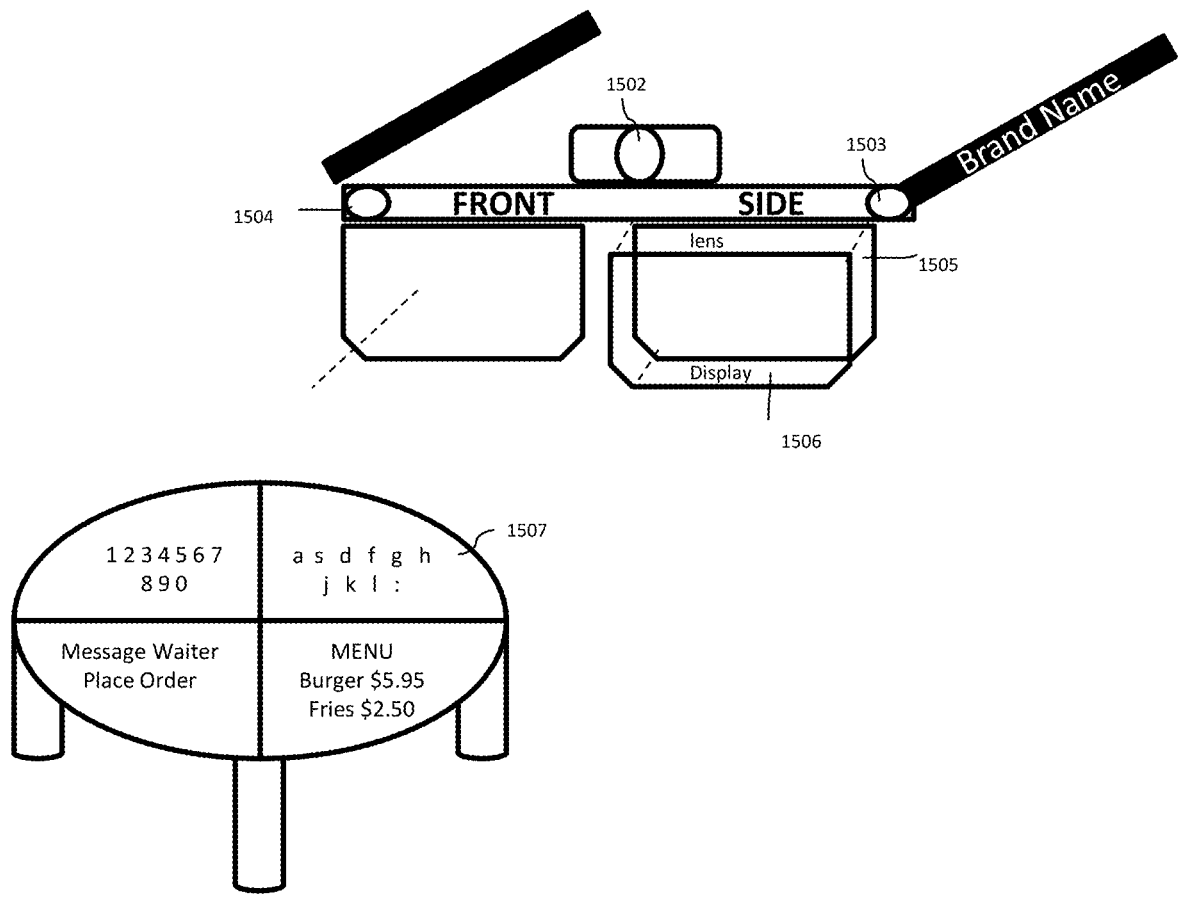
FIG. 15 shows the intelligent electronic glasses viewing a virtual keyboard, menu, or other menu command action in a display area of the glasses.

Referring to FIG. 15, shows an intelligent electronic glasses 1501 with a front facing digital still or video camera 1502, side facing camera 1503, second side facing camera 1504, and a lens 1505 and a display 1506 layered on top of the lens 1505. A standard table 1507 may be made into an intelligent surface with the intelligent electronic glasses 1501. The augmented information is displayed on the table top. The cameras 1502, 1503, and 1504 capture the gestures of a person's finger and map the actions to the contact areas of the augmented images. Various actions can be made including actions that involve Internet resources and servers. This may be applied to restaurants where individuals may access a menu and message a waiter. The device may act in a standalone capacity by communicating directly with servers using a built-in wireless radio and antenna.

Figure 16:
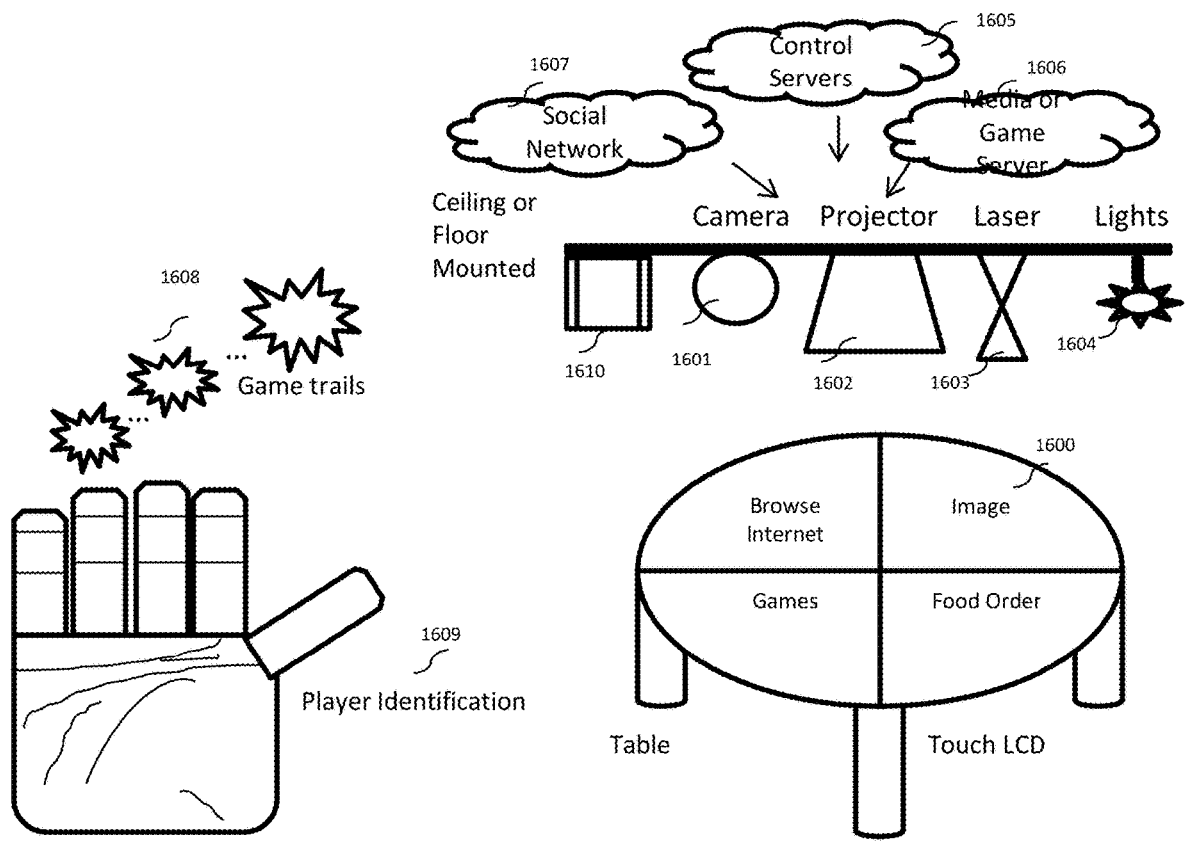
FIG. 16 shows a hand interacting with an intelligent table, where the table has a touch sensitive display. The movement of the hand may be tracked by a camera or laser. Alternatively a person in a room may be tracked using the camera and engaged with games. As an example, the system may allow for a baby to be monitored by the camera and interacted with a remote person such as a parent, baby sitter, or teacher using a local projector. The intelligent table may be used for interacting with people in the room. A projector in the conference room may further create a hologram of a person or object.

Referring now to FIG. 16, a room may be configured with a camera 1601, projector 1602, laser 1603, and lights 1604; all of these objects may be mounted on a wall floor or other surface. These items may each be wirelessly enabled and addressable over Internet Protocol with an IP address. A local or network control server 1605 may control the functions of the device including the on/off state. The control server 1605 may be accessed using a mobile device/intelligent electronic glasses/headset. A media or game server 1606 may be enabled to send content wirelessly or using an HDMI or other wired cable to the projector, mobile devices, intelligent electronic glasses or headset. This content may in turn be projected on to the table top if the table top is non-touch enabled. Alternatively, the table top may be enabled with a touch screen display, wireless transmit and receive radio, camera, and other electronics. Projected content may be positioned on the table and allow for games, Internet content, and actions to be actuated by touching the area of the table. For game play, players may be able to animate their moves such that hand movement produces trails of movement similar to dust in the air or slow motion movement so that others can follow the gesture. Each player may be recognized by the image of their hand 1609. Alternatively, content such as images acquired during the day from a mobile device or intelligent electronic glasses or headset and posted to a social network server 1607 may be displayed on the table 1600. The lights 1604 and speaker may be synchronized to the digital media including video, images and audio. The digital media may be streamed from a media server 1606. These activities may be applicable to home theaters, bars, restaurants, and other locations. The functions described may also be enabled by a mobile device if appropriately positioned around a table.

Figure 17:
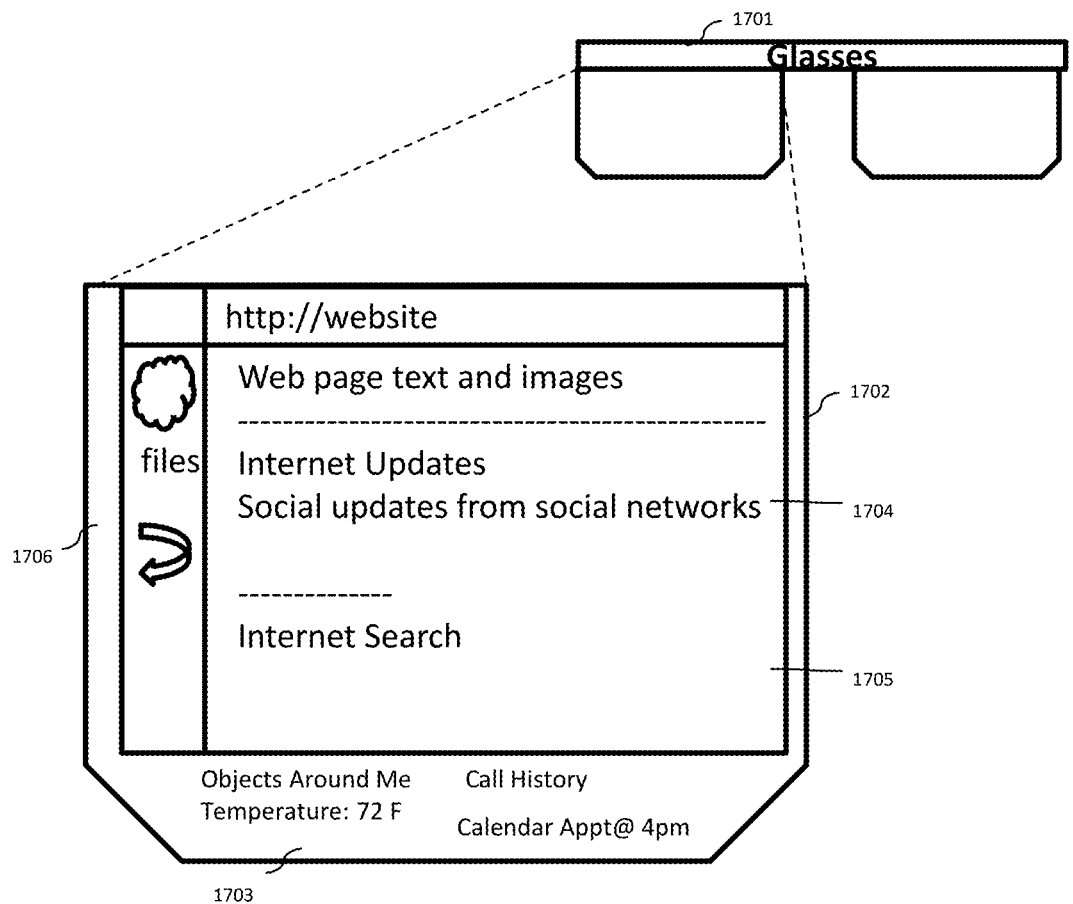
FIG. 17 shows the display of the glasses with Internet and web based content. The content obtained and displayed is related to the audio obtained from a microphone. A text message may be sent to a mobile device or intelligent electronic glasses or headset.

Referring now to FIG. 17, a view from the inside of the glasses 1701 is shown. The display 1702 may be configured to show black and white, color, grayscale images, videos, and text. The glasses 1701 are able to access local content available on a proximate mobile device and distant content available on network or Internet servers. Various notification services are available that automatically update specific areas of the display 1703. For example, weather changes may automatically be updated on the display. Alternatively, activity feeds from social networks 1704 may additionally be available. The device may further be display may further provide related data such as recent call history and calendar appointments. In a fully standalone mode, the intelligent electronic glasses may function as a cellular telephone. In a paired mode, the intelligent electronic glasses may function in collaboration with a mobile device including a cellular telephone. In this instance the intelligent electronic glasses requests specific data from the mobile device using an API and communication protocol such as Bluetooth or WiFi.

The glasses 1701 may further be enabled with a microphone. The audio captured from the microphone may be automatically converted from spoken audio to text using the processing power resident on the intelligent electronic glasses, a mobile device, or a local or network server. The text of the audio conversation may be shown as translated in the display. This may be valuable for individuals that are hearing impaired. Further, as words are translated, content may be dynamically searched on the Internet or another server to provide related information to the spoken audio. This search and relation may be performed automatically or manually and may be predicted using behavioral models. These behavioral models may suggest related conversation topics or perform internet searches during the conversation. For example, when a new person is encountered, the audio system may recognize the voice of the person or the camera may recognize the face of an individual and identify the person using a database located on a social network. Further, the device may automatically search keywords from the conversation and present results in the display 1705. A user may browse the internet and use spoken commands to control the display. Various commands may be available in one or more toolbars 1703 and 1706. Content in the display may further be updated dynamically based on the context including location.

Figure 18:
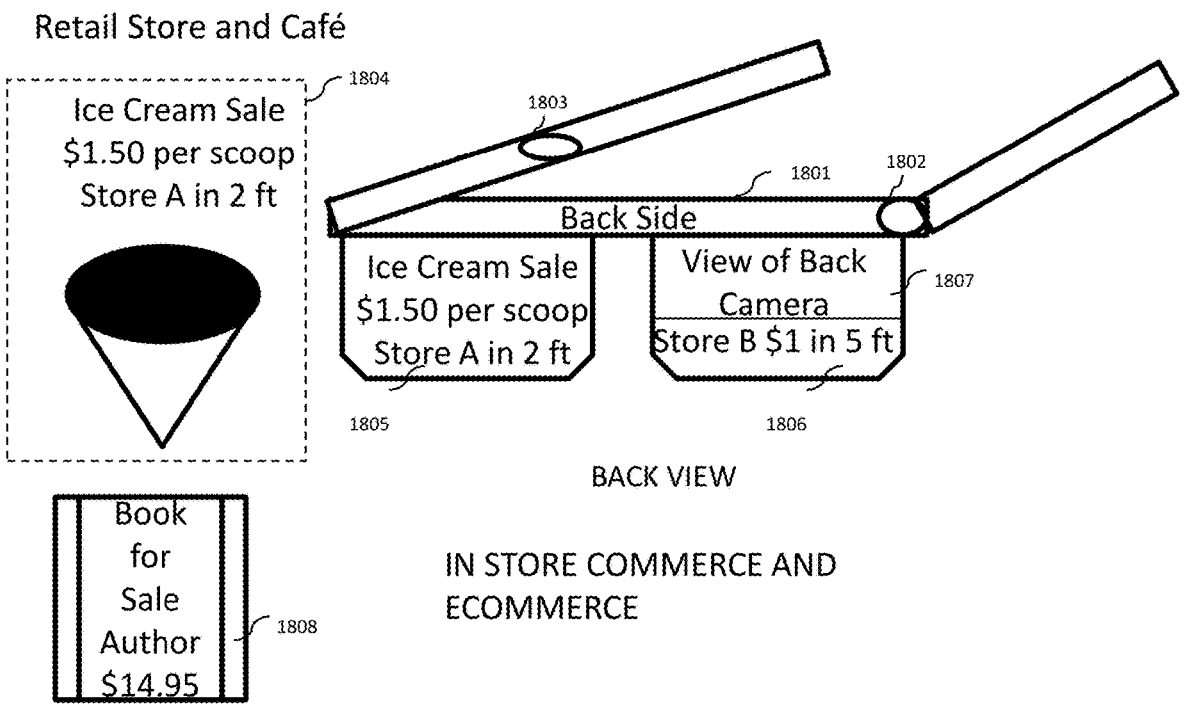
FIG. 18 shows the rear view of the glasses where the display is integrated into the lens. The content showed in the left lens includes shopping data about an ice cream product. The actions that a person does may be linked to a game and allow for badges, rewards, loyalty points, and coupons. As an example, a person that looks at an ice cream cone multiple instances may then be offered a coupon for 10% off to a competing ice cream shop located nearby. The augmented reality system may be linked to a virtual scavenger hunt in which brands advertise and reward individuals for competing tasks including trying on physical or virtual goods.

Referring now to FIG. 18, is the back side of the intelligent electronic glasses 1801. The glasses 1801 may be configured with a rear view camera 1802 that captures video and images behind the glasses. A side camera 1803 may capture peripheral imagery. These images and video may be combined together to provide 3D and 360 degree video experiences for future playback. The rear camera 1802 may further be used so that an individual need not look behind themselves to see what is occurring.

The glasses may further be used in a shopping experience. Offers and coupons may appear in the display 1805, 1806, and 1807. Advertisers may bid on space on the lens in real time using real time bidding exchanges and platforms. Advertisers may also make bids to offer discounts, deals, and coupons based on the location of the glasses and the object being viewed. In FIG. 18, an ice cream cone is being viewed in the glasses. The price of the product may appear in the left display 1805. A competing offer from a related vendor may appear in the bottom right display 1806. Alternatively, a camera may capture an image of a book, send the image to a local or network server for processing, and the server in turn may return data and meta data about the book including price comparison shopping data. This meta information may be viewable on the display or projected. A person may purchase the book using a mobile device or the intelligent electronic glasses or headset using the display or spoken audio commands.

Figure 19:
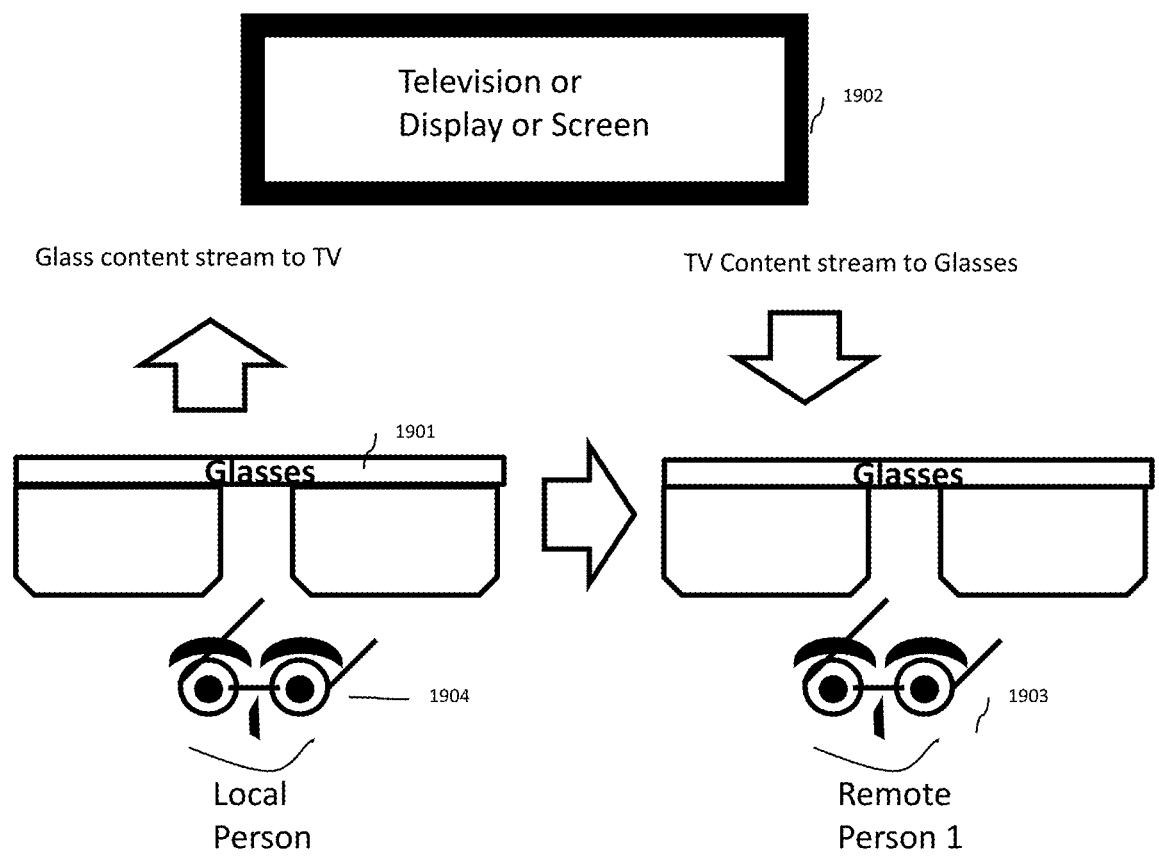
FIG. 19 shows content obtained from the intelligent electronic glasses being sent to a first television for display on the television. The glasses camera may further capture content from the television and stream the content to a remote person. This allows a remote person to be patched into the viewing experience.

Referring now to FIG. 19, a mobile device or intelligent electronic glasses may stream content to a television or other display. Content may be streamed directly from the mobile device or glasses 1901. The content may also be streamed to a remote person or server. In another instance, content may be displayed on a television or streamed from a television server to a variety of devices. When content is displayed on a television, a person may view the content through the glasses unobstructed. The glasses 1901 may record the displayed content and send the content to a remote person 1903 to view the displayed content on the television. The remote person may view the content in a web browser or television or mobile device or intelligent electronic glasses. The remote person 1903 may further stream content to a local person's glasses 1904 and the local person can stream the content to the television 1902. The television may be a smart television, 3D television, projector and screen. Alternatively, interactive content related to the viewing experience may be displayed in the glasses 1901. Marketers may wish to provide additional information about the cast and crew of a television show for example. Alternatively, marketers may wish to track the advertising effectiveness of campaigns. The glasses may provide an inward facing camera that can track eye movement and focus to provide better reporting on whether ads were viewed. Participants may opt-in to this tracking and receive promotions and related discounts.

Figure 20:
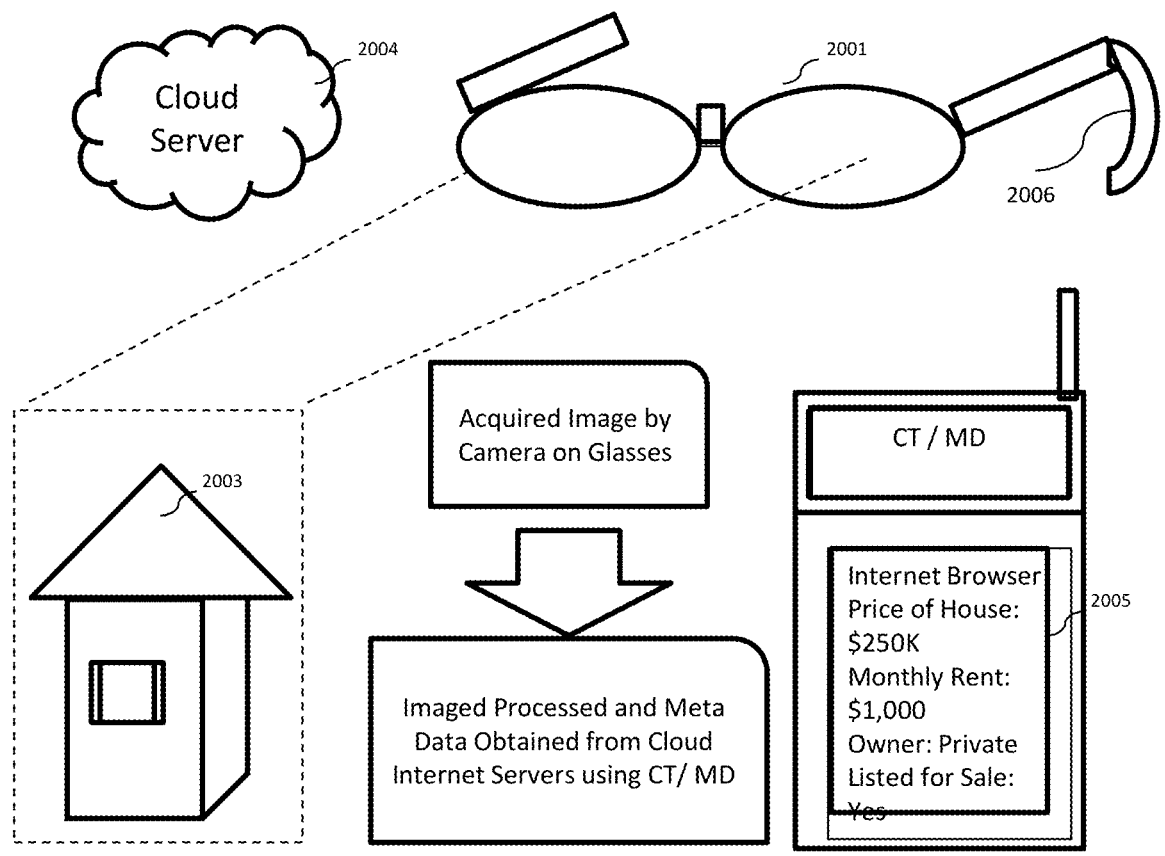
FIG. 20 shows an intelligent electronic glasses with a camera where the camera captures an image of a house, processes the image using a smartphone. The information may be displayed on the smartphone.

Referring now to FIG. 20, an intelligent electronic glasses 2001 or a mobile device 2002 may capture video and images of an object such as a house 2003 using a camera or cameras. This digital content may be processed locally on the intelligent electronic glasses 2001 or mobile device 2002. Certain intelligent electronic glasses 2001 may not have robust processing capabilities. In this instance the glasses will send content or stream content wirelessly to the mobile device 2002 or a cloud server 2004. Related content may appear in the display of the mobile device including price and commerce related information 2005. Alternatively, the content may be made into spoken audio and played in an in-ear speaker 2006.

Figure 21:
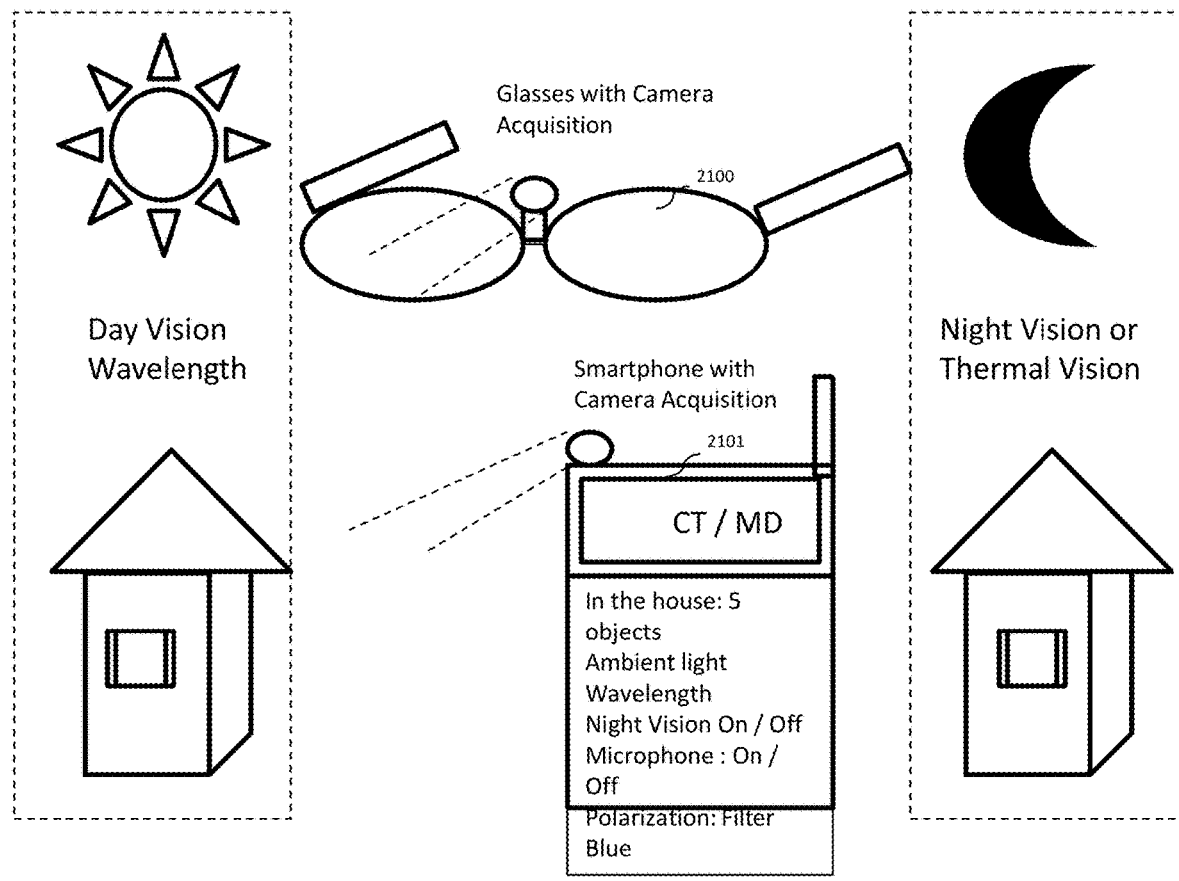
FIG. 21 shows an intelligent electronic glasses obtaining an image of a house, send the image data to a CT/MD, and the CT/MD further displaying this information on the display of the CT/MD. The glasses may also be used for night vision or thermal vision.

Referring now to FIG. 21, the cameras on the mobile device 2101 or intelligent electronic device 2100 may function in daylight and night time. The devices may be fitted with various computer vision capabilities and night vision capabilities. Various filters and polarizations may be implemented in software or hardware to alter the images.

Figure 22:
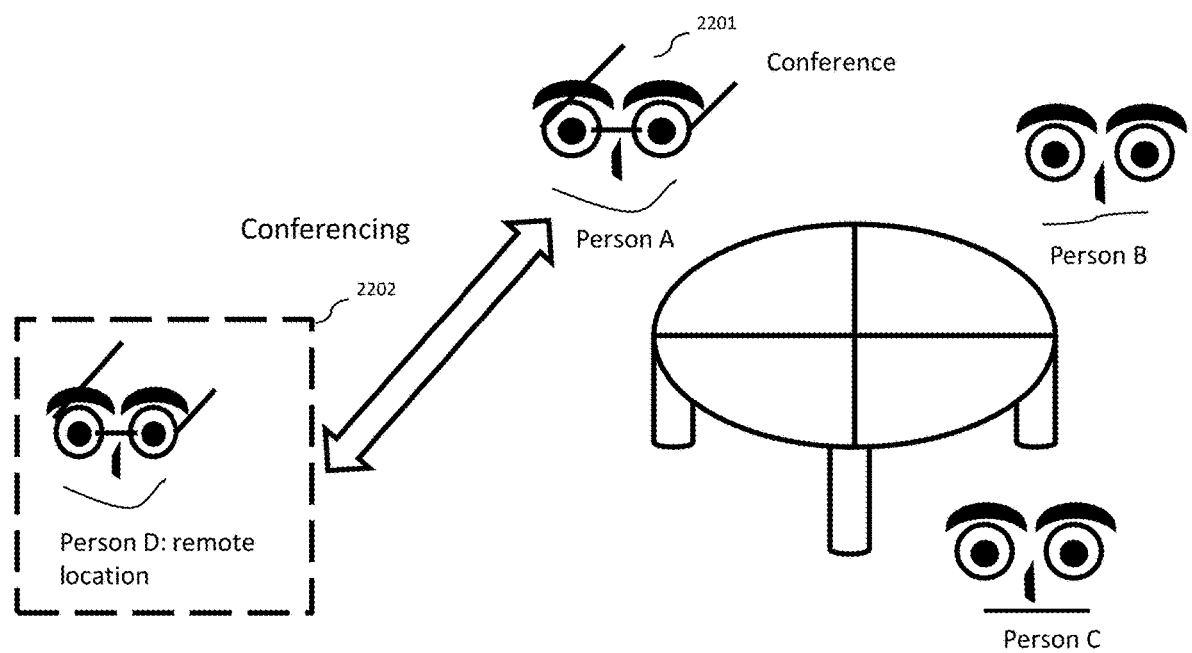
FIG. 22 allows for an intelligent electronic device used in a multi-party conferencing system. Person 1 has an intelligent electronic device with a camera that obtains video and images of two other persons. This content is then streamed to a remote person 4 which can then advise and participate in the conference. This may allow a local or remote person to look at an environment from the vantage point of another person. This may be useful for a negotiation. If multiple image/video capture devices are used, a person can request to participate in an experience or view a recorded experience (including a live action conference, theater or movie experience) from the vantage point of another person. A remote person may log-in to the view of another person's glasses.

Referring now to FIG. 22, the mobile devices/intelligent electronic glasses/headset may be used in multiparty conferencing. In this instance only person A, 2201, is wearing intelligent electronic glasses. Person A 2201 is in communication with a remote person D 2202. The images obtained from the camera on Person A 2201's glasses capture the audio, video, images and expressions of Person B and Person C. This data is transmitted wirelessly to Person D 2202. Person D is then enabled to participate in the conference by speaking and transmitting spoken audio to the glasses of Person A 2201. The audio may then be emitted from the speakerphone on Person A 2201's glasses. Alternatively, the audio may be only played for Person A 2201. This latter scenario may be useful if Person A 2201 and Person D 2202 are in a special private collaboration relationship. This may occur when multiple people from different organizations join together for a conference.

Figure 23:
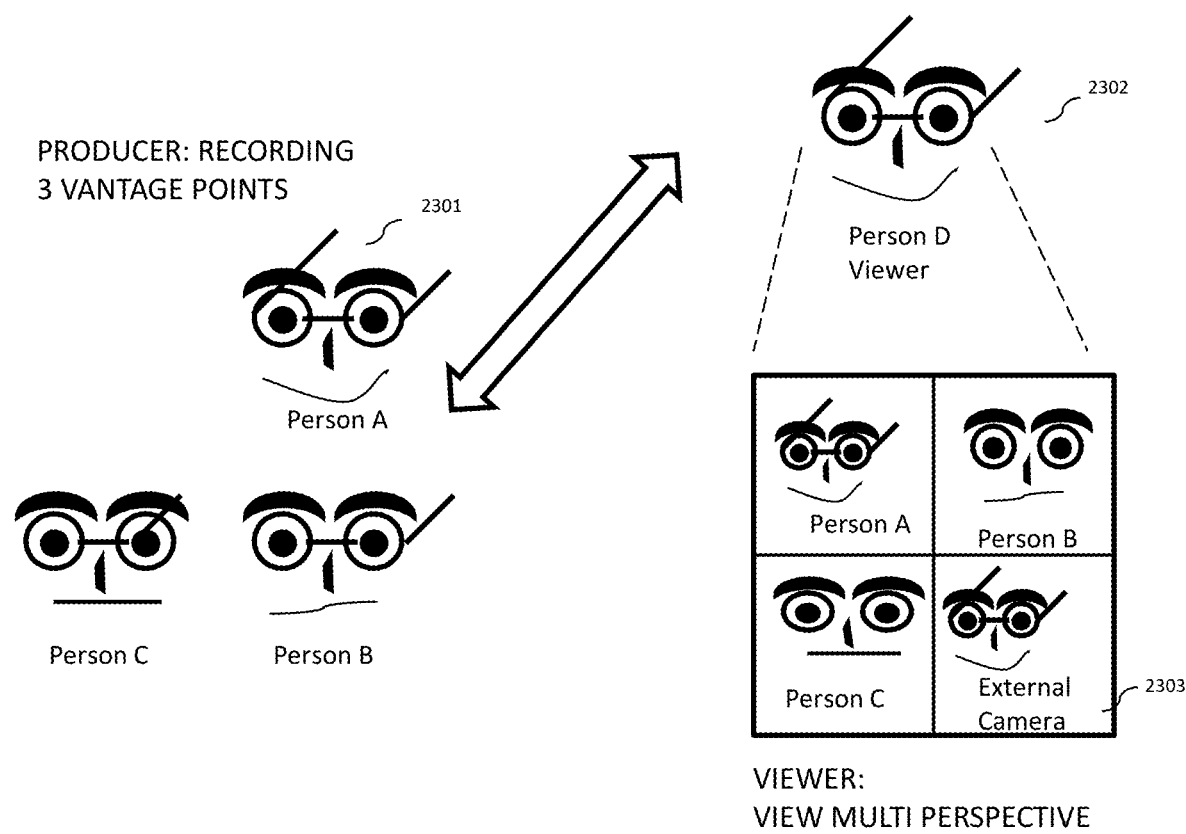
FIG. 23 shows a set of participants in a recording environment in which multiple people are wearing intelligent glasses. All the participants are viewable in one screen on the lens of a glasses. Alternatively, a person viewing the experience at a later time may switch vantage points.

Referring now to FIG. 23, all participants, persons A, B, C, and D are wearing glasses. A remote person D 2302 may rotate into the vantage point or view point of Person A, B or C. This may allow for enhanced collaboration as each person can better view the expressions and emotional states of each other. Alternatively, Person D 2302 may view all participants simultaneously on one screen 2303. The rotation into another vantage point of a person may enabled for recording movies in addition to conference collaborations. As an example, actors may wear cameras that record each seen from each actor's view point. During the viewing experience, viewers may switch into the vantage points of different characters to have uniquely different movie experiences.

Figure 24:
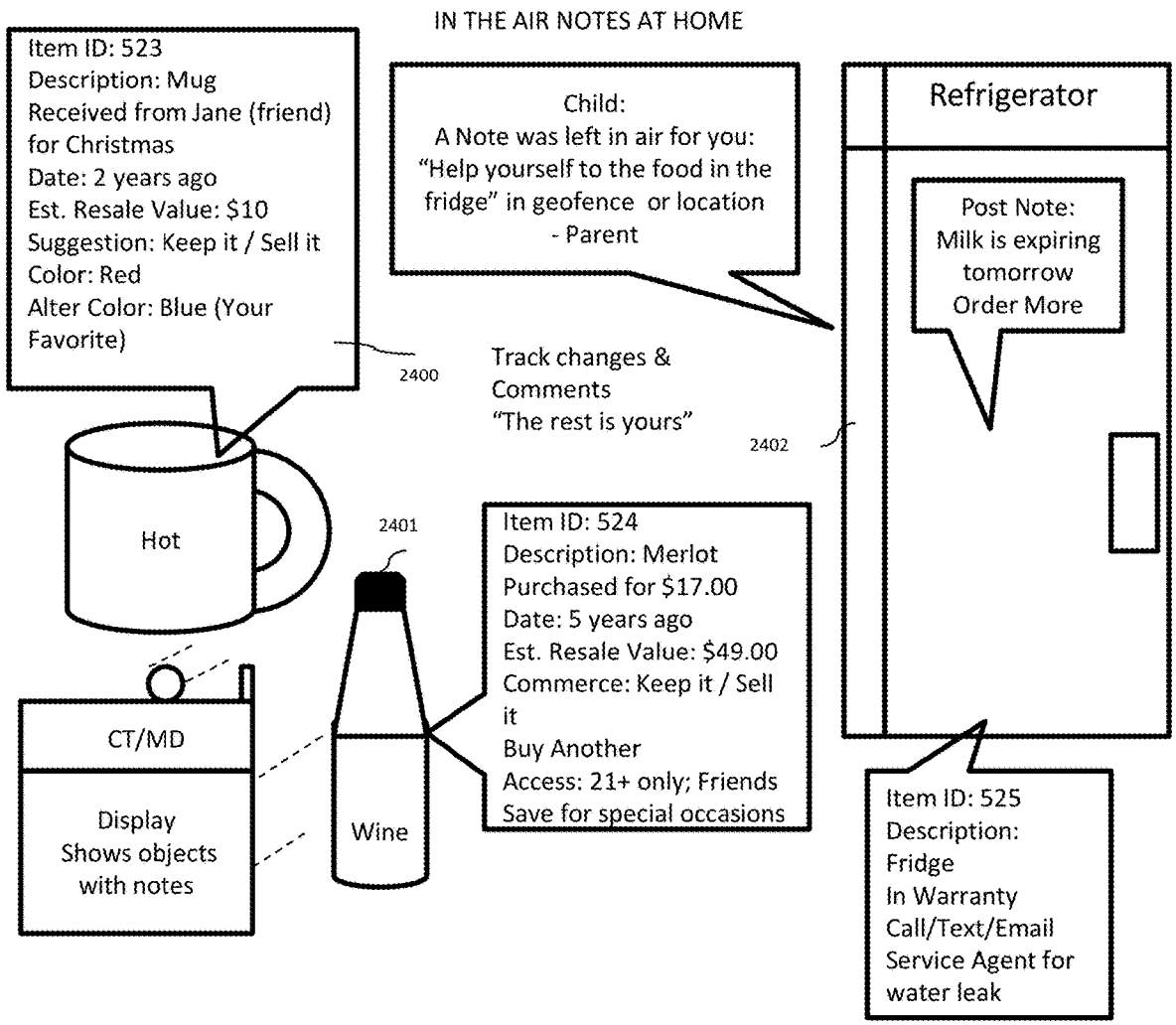
FIG. 24 shows a description of virtual notes being associated with a device. Items may be highlighted, bold, changed in color in a virtual context. These notes and environments may be saved by a user and viewable by anyone in the geofenced area or all users. This may allow for a personal diary of continuous data to be created. A series of questions and answers may be created to help facilitate structured and unstructured data. Notes may also be reminders that are generated based on predictive analytics of a person's behavior. The consumption of food may be tracked and the calories consumed may be calculated. A camera may image food as a chef is preparing or while a person is consuming the food. Food imagery may be processed for image recognition and nutritional value using a local or network server. A report on nutritional value of food consumed and recommendations on behavioral improvements may be created and delivered daily. Fitness information may also be gathered from movement data. An individual may view the object in the display of a smartphone or table computer or the display of the intelligent electronic glasses or the headset display.

Referring now to FIG. 24, various digital notes and digital comments 2400 may be saved and associated with objects. These notes may be specific to visible to specific users based on authentication and access control lists. Notes may have a certain time to live and expire based on actions completed or time completed. An physical environment with digital notes may be saved, edited, or deleted. An individual may capture an image of an object using a mobile device/intelligent electronic glasses/headset, tap an the object on the display screen, and write or speak notes regarding the object. A person may view the environment using the display of a mobile device/intelligent electronic glasses/headset as part of an augmented reality view. Each object may be identified using image recognition software. Alternatively, labels or bar code images may be affixed physically to each object and then mapped in a table. Comments may be geofenced to particular GPS areas or regions. Each object may have various macros and functions associated with them. As an example, a milk object may be imaged for an expiration date automatically. A wine object 2401 may be locked for consumption by individuals over 21 years of age. A camera in a room may track the consumption of the object. An alert may be sent to an owner if the object is consumed. An individual may be identified using location, audio, retinal recognition, or facial recognition. Appliances 2402 may be locked physically based on the person in a room. If the appliance is recognizes an individual or is notified of a specific criteria, the door may be locked. As an example, a family that wishes to prevent children from eating too much ice cream may set a configuration to lock the fridge door if the person in the room is a child between certain hours of the day. The child may be imaged by a camera on the refrigerator 2402.

Figure 25:
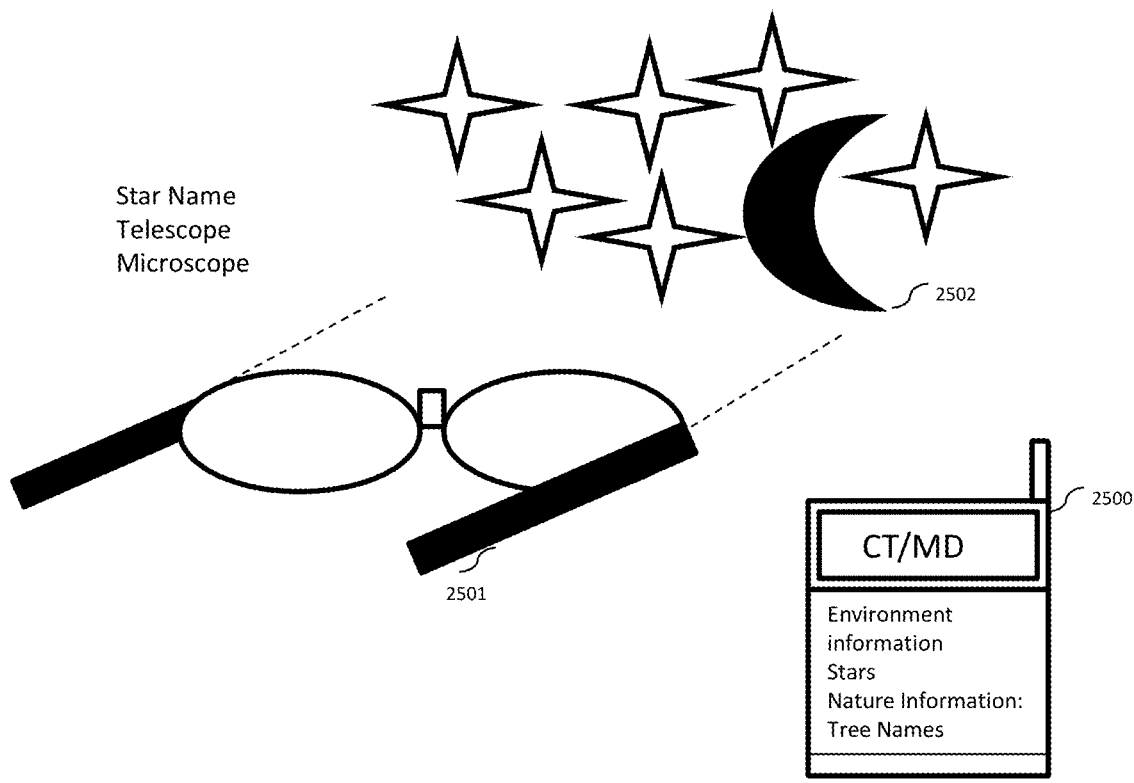
FIG. 25 shows the glasses being used outside to focus and recognize distant and proximate objects. This information may be displayed on the cellular telephone and mobile devices. The mobile devices/intelligent electronic glasses/headsets may be used in other outdoor contexts and underwater. As an example, underwater the glasses may be configured as underwater goggles and image fish and plants around the person.

Referring now to FIG. 25, a camera affixed to a mobile device 2500 or intelligent electronic glasses 2501 may be used in conjunction. Various objects in the distance such as stars 2502 may be identified by a telescope lens. Alternatively, nearby objects may be identified by a microscopic lens. The information obtained from a camera may be show on a display such as the display on a CT/MD.

Figure 26:
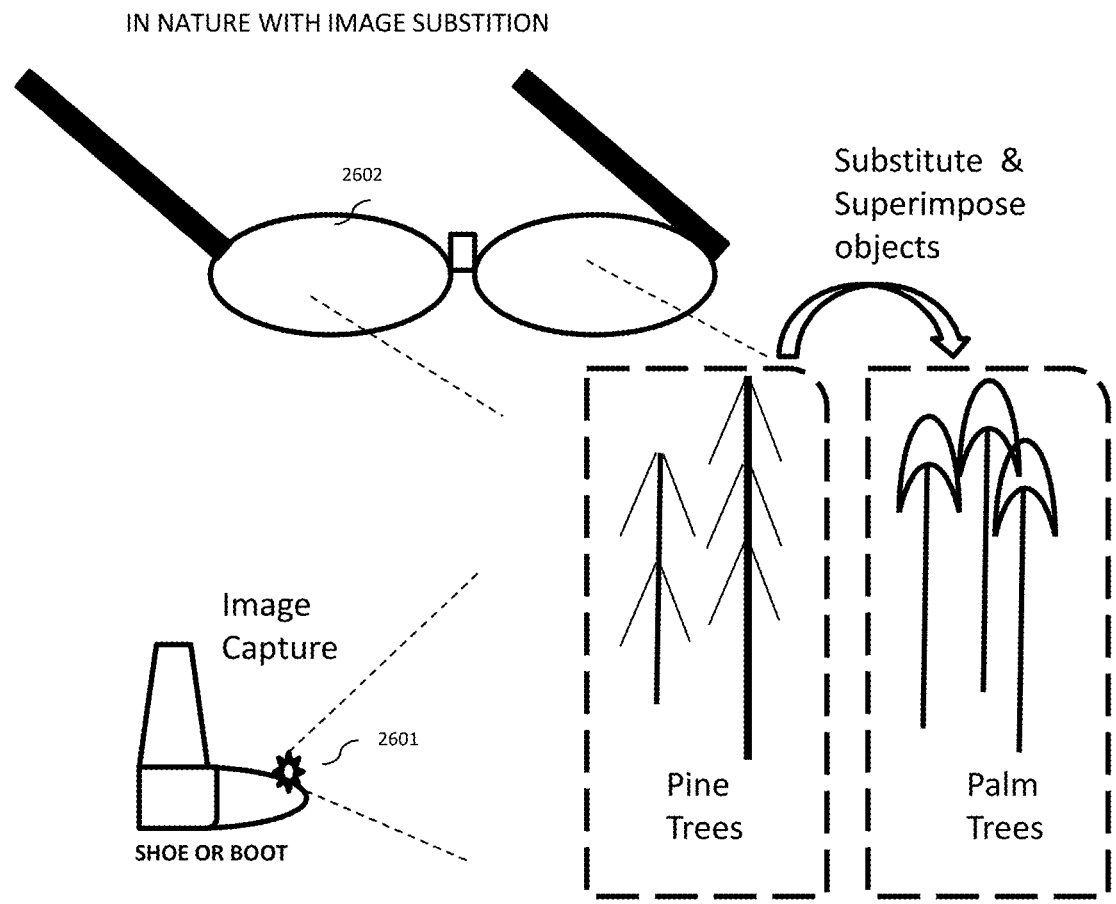
FIG. 26 shows image capture of objects and the transformation of those objects in the display. The images obtained may be processed and changes may be enacted such that they are displayed virtually different than they are physically. As an example, an individual that wishes to be at a beach environment in Hawaii but instead is in a forest environment in Lake Tahoe may substitute the images displayed. A person may also be patched into a vacation by viewing the experience of an individual. Alternatively, the substation may be of people, allowing a person such as a family member that is not present or an avatar of a person who has passed away may be added to the environment. Alternatively, the background images may be changed to allow a dreary dark day changed into a bright sunny day.

Referring now to FIG. 26, cameras may be affixed to a number of items including shoes. The camera may image various items. An intelligent electronic glasses may be configured using a toolbar or a software application resident on a mobile device to substitute various images. For example, certain objects such as pine trees may be substituted with palm trees in the display. A remote database of related images may be accessed. Alternatively, a search engine may be used.

Figure 27:
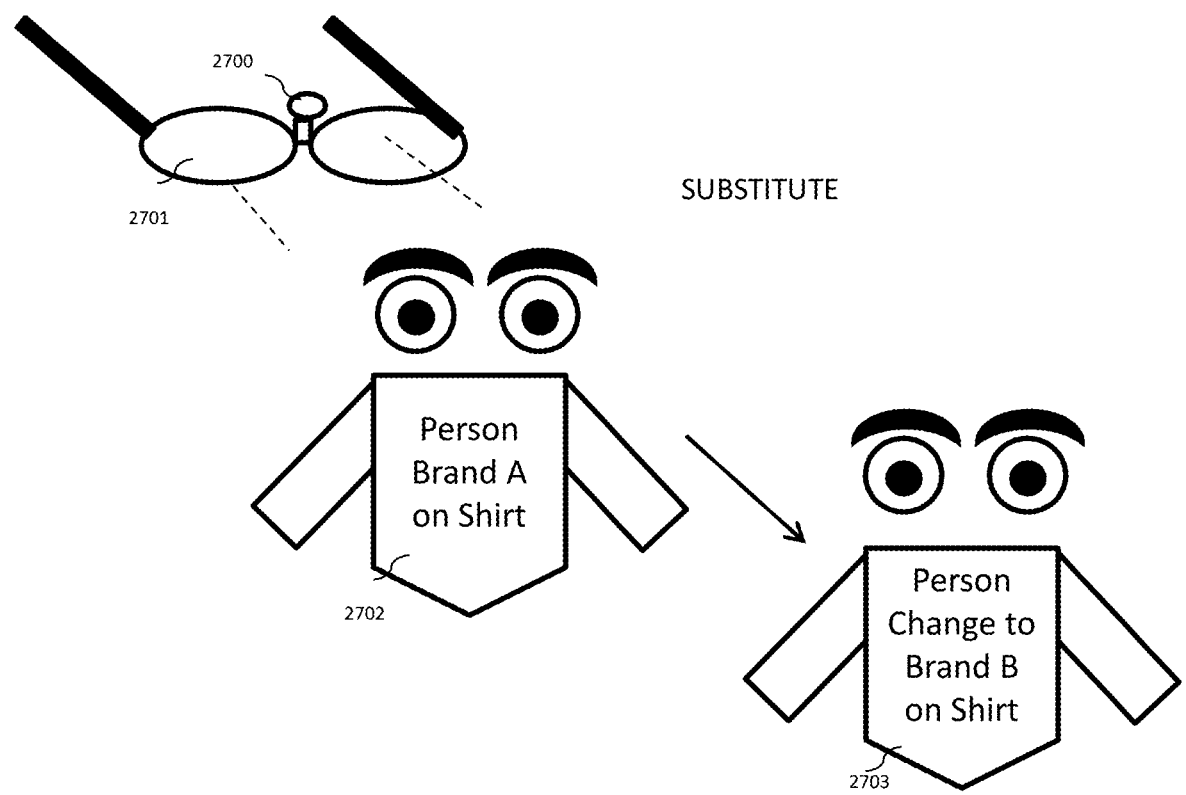
FIG. 27 shows images obtained from a camera may be processed and displayed differently in a virtual image versus the physical appearance. A brand may be modified from a first brand to a second brand based on user settings or advertising bidding. Additionally, a second person wearing the products of a competing brand may be displayed in the augmented reality system when an individual is look at a first physical product. This may further enable virtual shopping assistants in malls or stores. The virtual shopping assistants may be configured to connect to a call center. Shipping of a physical product may be enabled based on the purchase of a product in a augmented reality system or virtual world.

Referring now to FIG. 27, a camera 2700 may capture real world content which may be displayed in a mobile device/intelligent electronic glasses/headset 2701. This content may be modified in real time. As an example, when an individual is viewing content including a person 2702 wearing brand A shirt is seen, the image or video displayed may be altered to show brand B. Other factors such as shirt color or physique may be modified. These modifications may be based on user preferences. Alternatively, advertisers may bid for certain people's viewing experiences or to replace certain brands with other brands.

Figure 28:
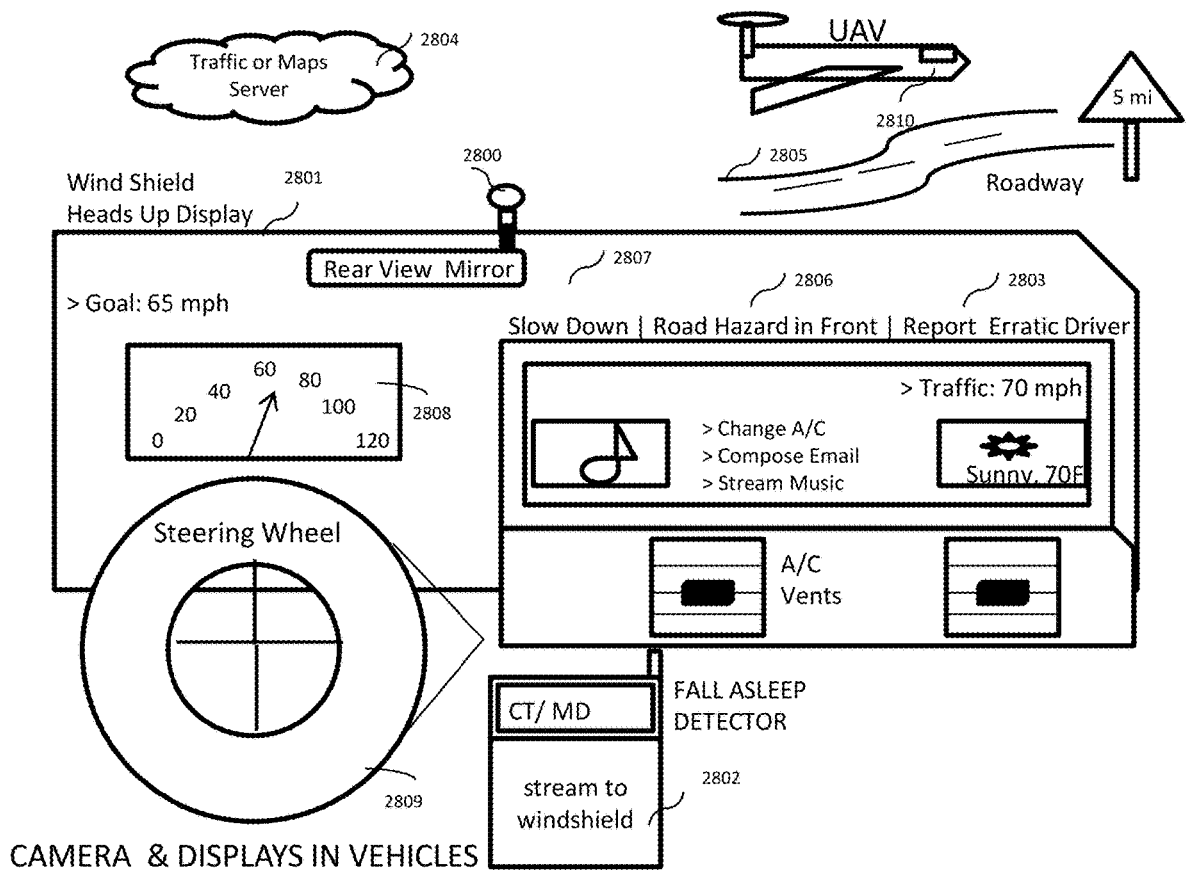
FIG. 28 shows various information presented on the display of a car. This information may be obtained from the camera which images a road and environment and displays the information in the glasses, on the dashboard of the car or on the display of a mobile device. The information may further be helpful to police and emergency services. A camera in the car or the glasses itself may be used to image a person's eyes or other body functions and prevent drunk driving or driving while sleepy by measuring eye fatigue.

Referring now to FIG. 28, a camera 2800 may be used in a driving context. The camera 2800 may be integrated into the car, affixed to the car, integrated into the intelligent electronic glasses, or part of a mobile device. Multiple cameras may be used. The digital content obtained from the camera may be processed by a integrated car electronics or server or on the mobile device/intelligent electronic glasses/headset. The car may be enabled with a heads up display or other projected content for images and processed content to appear on the windshield 2801 of the vehicle. Alternatively, content may appear in the lens of the glasses or the display of the mobile device 2802. A driver may be able to interact with various touch screen controls in the vehicle. Alternatively, the user may control the on-board electronics using gestures or the CT/MD or spoken audio commands. These spoken commands may include control of the A/C and other on-board features. Content may be streamed directly from the mobile device to the windshield display. The windshield 2801 may further feature ads from nearby businesses. A video conference may be held and positioned in a separate area of the windshield such as 2807 to allow for in vehicle conversations that allow the driver to focus on the road. Alternatively, the car may be set into a self-driving mode where an onboard driving computer or the mobile device controls functions of the car including speed 2808, acceleration, braking, steering 2809, and vehicle maintenance. Cars may be enabled with remote vehicle control where a server can control all the functions of the car.

Still referring to FIG. 28, the roadway may be imaged and scanned by one or more cameras for potential hazards, traffic data, or other purposes. The hazards and traffic information may appear in a selected area 2803 of the windshield 2801. The traffic information may further be sent to a maps, traffic, or location tracking server 2804. The GPS system and navigation system may be used from the car, mobile device, glasses, or headset. The cameras may also send data to a crowd-sourced traffic and mapping data base to improve maps of roadways. The driver, license plate, make, and model of the car in review may be captured and sent to a database.

Still referring to FIG. 28, an individual may receive predicted driving information such as the need to slow to a specific speed based on turns, traffic, and hazards 2806. The mobile device/intelligent electronic devices/headset may be used to access an image or video stream several miles ahead so that a driver is aware of potential traffic. The driver may be personally imaged by inward facing cameras to track driver fatigue. The driver may also report other drivers such as potential drunk drivers to police, emergency services, or a crowd sourced database of suspected drivers. Major traffic violators may have a conditional driving license which allows for police or emergency to login remotely to the vehicle and control all the driving actions of the vehicle from a remote operations center. This remote control may be done programmatically by a computer or by a human on standby. The human in the remote center may see the entire view from the car on a display on a wall, mobile device, intelligent electronic glasses, or headset. Alternatively, a police car or aerial vehicle, such as a helicopter, plane, aerial vehicle, manned aerial vehicle, unmanned aerial vehicle (UAV) 2810 or drone may be sent to obtain information about the vehicle provided that the appropriate cities and municipalities have approved such usage. These rules may be stored in a network server. Alternatively, an aerial vehicle may be used for electric vehicle wireless charging using induction, resonant magnetic coupling, or other means. In this case, the vehicle may be fitted with a wireless charging pad, battery, AC/DC, converter, controller, and other components and system. A UAV 2810 may fly slightly above the vehicle to allow for transfer of energy from the UAV 2810 to the vehicle using focused beams or transmitting pads. The UAV may use radar, lasers, or cameras to gauge speed or distances. This may allow for a driver to avoid stopping at an electric charging station. Alternatively, charging towers on the roadway may be used to charge the vehicle. A UAV 2810 may allow for package and mail delivery, restaurant, or fast food delivery to a stationary or moving vehicle through a sunroof or window. The UAV 2810 may use a plurality of cameras, wireless transmit and receive units, lasers, sensors, and remote displays for communication. The UAV 2810 may broadcast these images and videos to a traffic server. These UAV 2810 may also be used for elderly care or personal security by tracking and following specific individuals and further recording associated events. Alternatively, the UAV 2810 may be dispatched for managing logistics and inventory, delivering packages from a store to a home, following a friend, and searching for people in the area, signaling for help to authorities, and providing a actuated map of the area to a phone, watch, intelligent electronic glasses, headset or server. Multiple UAVs 2810, manned vehicles, self driving cars, ground based vehicles, may coordinate for lane changes, landings, or other activities with each other using a peer to peer connection or remote server.

Drivers in manned aerial vehicle including low-altitude aerial vehicles may also use the mobile device/intelligent electronic devices/headset for navigation signs, road markers, and lane markers. The line markers may controlled by a traffic server or central transportation server such that augmented and virtual road signs can be displayed in regions above the air. This may allow aerial vehicles to travel on freeways above land based vehicles. Various vehicles including manned aerial, unmanned aerial, self-driving, ground based vehicles may further contain a server coupled with wireless transmit and receive capabilities to notify and negotiate traffic, lane changes, and driving with other local cars.

Figure 29:
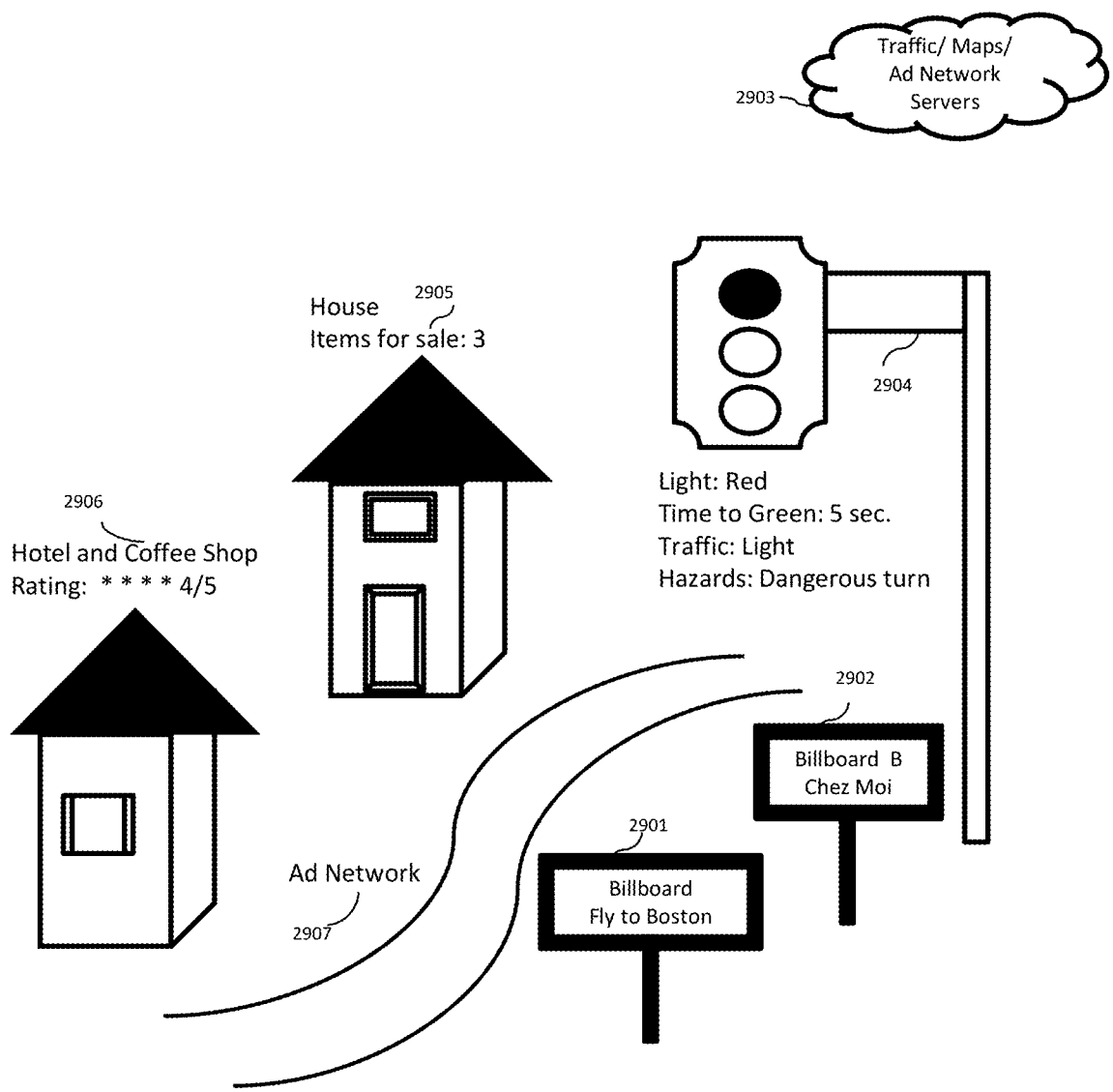
FIG. 29 shows notes and information about various houses, stores, traffic lights from the view of a display. These notes are obtained in response to the images obtained from a camera on the mobile device/intelligent electronic glasses/headsets. The billboards viewed by a user may change in response to the person viewing the objects.

Referring now to FIG. 29, advertisements on billboards may be modified based on the cars on the roadway or people walking on a street. Billboard 2901 may change its display based on the people around. These ads may be changed in real time using auctions, exchanges, and real time bidding advertising platforms. Alternatively, virtual billboards 2902 may be created and displayed on the car's windshield, individual's mobile device, intelligent electronic glasses, or headset. The virtual billboards 2902 may be animated and increase or decrease in magnification. The ads may be delivered by a server 2903. Other objects such as a traffic light 2904 may be annotated with information including time till the light changes and traffic conditions. These annotations may be sent in to the car, mobile device, glasses, or headset. Alternatively, an object such as a traffic light may broadcast a beacon of information. The traffic light 2904 itself may be in communication with a Internet, network, or Department of Transportation private server 2903. This traffic light may be able to receive remote software updates and maintenance from a server 2903. The traffic light may further be enabled with a wireless charging beam to allow for vehicle charging from the traffic light to an electric vehicle. The traffic light may be connected to a ground power supply and therefore be enabled to acquire power relatively cheaply. Drivers may pay additional fees to access these wireless charging networks.

Still referring to FIG. 29, various shops, hotels and restaurants may be augmented with annotations during the driving or walking experience. A house may appear with objects for sale or a sale price listing 2905. The data for the price of the house may come from an online real estate side or a real estate ad network 2903. A history associated with the individual may further be appended to the data. This data may comprise check-in data, GPS tracking information or other related data. Recommendations from friends and colleagues may additional be integrated into the augmented reality comments 2906.

For example, a location tracking server may capture the routes travelled by an individual and auto-checkin the individual to various stores. Alternatively, advertisers may bid on the routes 2907 for a specific or aggregate set of people based on time of day, demographics, or other factors. Various routes may be suggested to an individual by prediction software resident on a server that accounts for the drivers needs. For example, the driver may seek the shortest time, scenic route, likelihood of finding products/objects that they need to purchase, or ad supported monetization route. Advertisers may bid on these routes. Alternatively, a driver may make money by choosing an ad supported monetization route over a non ad supported route. An ad supported route may take a person through an up and coming district of shops. Traffic and maps servers and data may be used to assist in the routing.

Figure 30:
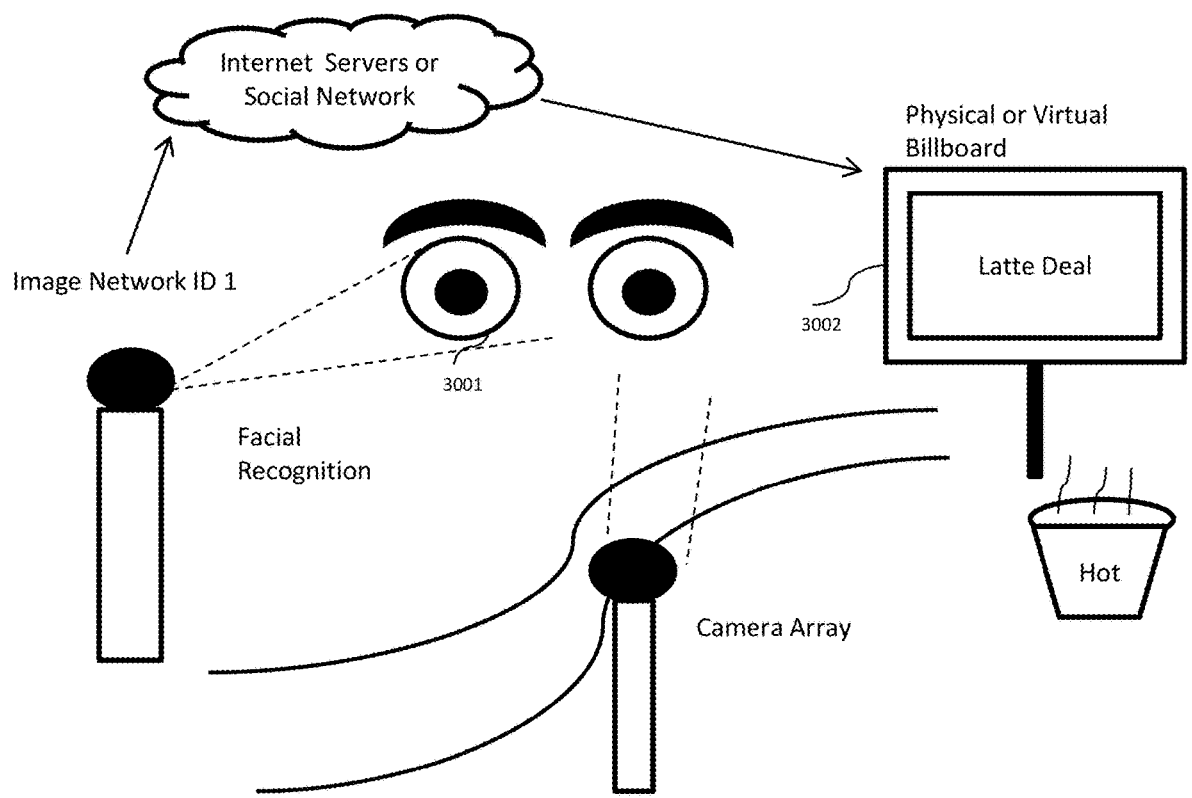
FIG. 30 shows a camera array network positioned in an environment that captures images of people and objects. For example, a person's eyes may be captured from the camera array, the information may be processed by cloud server for image recognition purposes, and physical billboard ads may change in response to the person identified. This may allow for real time physical world changes in response to the people identified. Alternatively, the billboards may change based on location, GPS, WiFi, NFC, RFID or other location targeting information.

Referring now to FIG. 30, an individual need not wear a camera, mobile device, intelligent electronic glasses, or headset to be imaged. An array of stationary or mobile cameras may operate as part of an image network continuously imaging people and collecting audio data with a microphone. These cameras may capture people's body, face, or retina or eyes 3001. The cameras may be in stores, cafes, malls, roadways, home, office and other locations. Each camera may be addressable with a unique IP address. The cameras may send acquired image and video content to a central server for processing and recognition. Other data sources including social networks may be used for facial recognition. The camera network may be used for a variety of purposes including tracking missing people, delivering targeted advertisements 3002, or providing directions to a person. The advertisements 3002 may be physical changes to a display for a person not wearing a display or virtual changes to a display for a person wearing a display. A second camera in the camera network may track whether a person actual saw a given advertisement to improve reporting and ad targeting. Various privacy settings may further be enabled and individuals may be able to opt-in or out of the network in return for certain promotions and benefits. As an example, a person who has opts in to the network may receive daily deals or targeted personalized offers 3002. Alternatively, the camera networks may be equipped with wireless power charging stations and allow individuals to charge devices. Larger cameras may also be placed on top of vehicles or on roadways to target drivers in a car.

Figure 31:
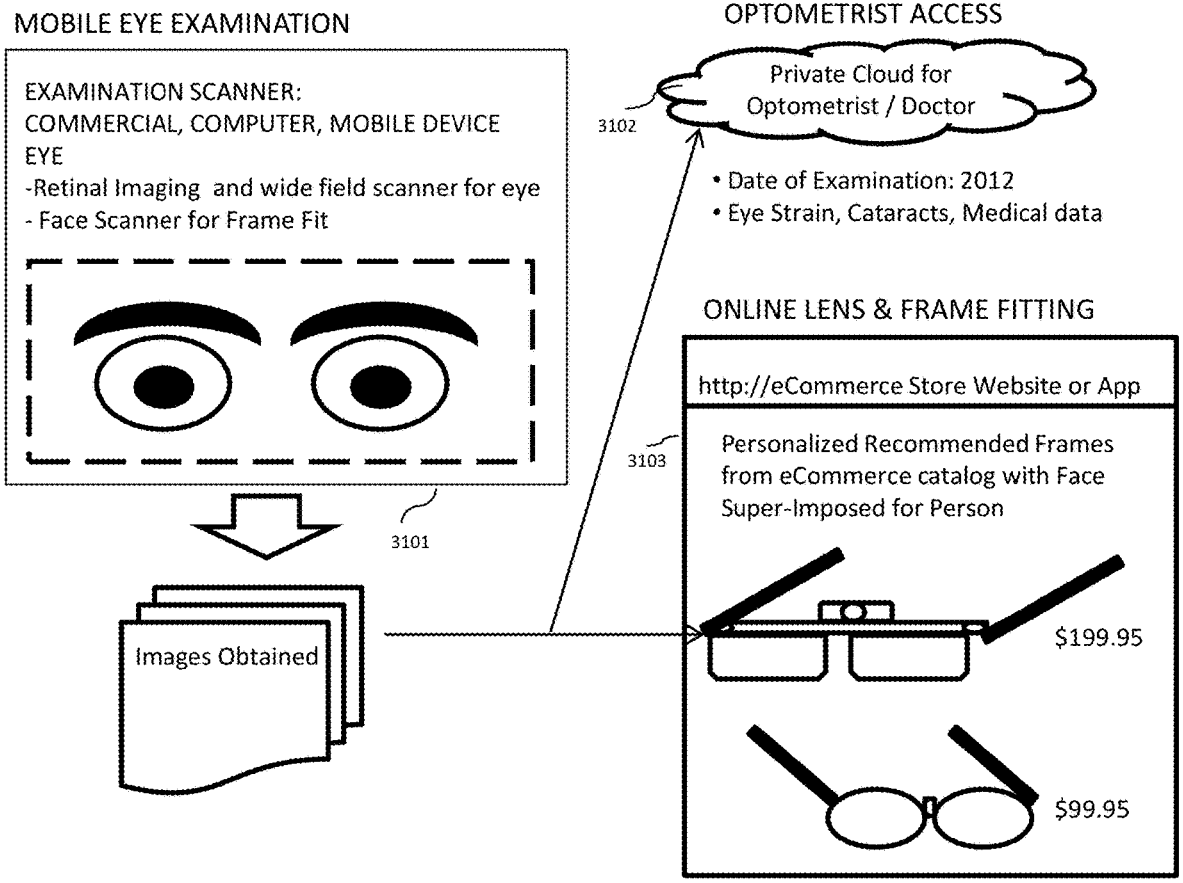
FIG. 31 shows an imaging and diagnostic scanner which scans the eye of an individual to check the health of the individual. The scanner may allow for an individual be retrofitted virtually with a variety of frames and allow a person to shop for frames customized to the person's face.

Referring to FIG. 31, a stationary or mobile eye examination scanner 3101 may be used to appropriately provide glasses, frames, and lenses to an individual. Software on a mobile device in addition to a camera may be used to image a person. This data may be sent to a private cloud server for an optometrist or doctor to review. The optometrist may then send data to an eCommerce website 3103 so that a person may purchase prescription intelligent electronic glasses or headsets personalized to the individual. Alternatively, a person who does not need a prescription may image his or herself using the mobile scanner 3101 and have the data sent directly to the eCommerce website or mobile application 3103. The eCommerce site may suggest and personalize frames and lens to the preferences and desires for the user. A person may view his or herself with a super imposed image of a pair of glasses on their face. A crowd or set of specialists may vote on which frame looks the best on a superimposed image of the person. The person may purchase the product and have it shipped directly to their current address using a new or stored credit card. Shipping may be done by traditional shippers, self-driving vehicles, UAVs 2810 focused on different distances such as last mile delivery, or people. A server that tracks the routes of people may be able to find the best person to deliver a product from a store to a person. People can agree to be personal shippers in this network. A server can assign shipments to people based on their travel routes. For example, a person that drives by a store on the way home from work may agree to deliver products for that store to neighbors in the person's zipcode or neighborhood social network. People and purchasers may pay for shipment using a payment network or digital wallet. This same payment system may be associated with a person's glasses such that credit card information is stored on a server to enable shopping with their glasses.

Figure 32:
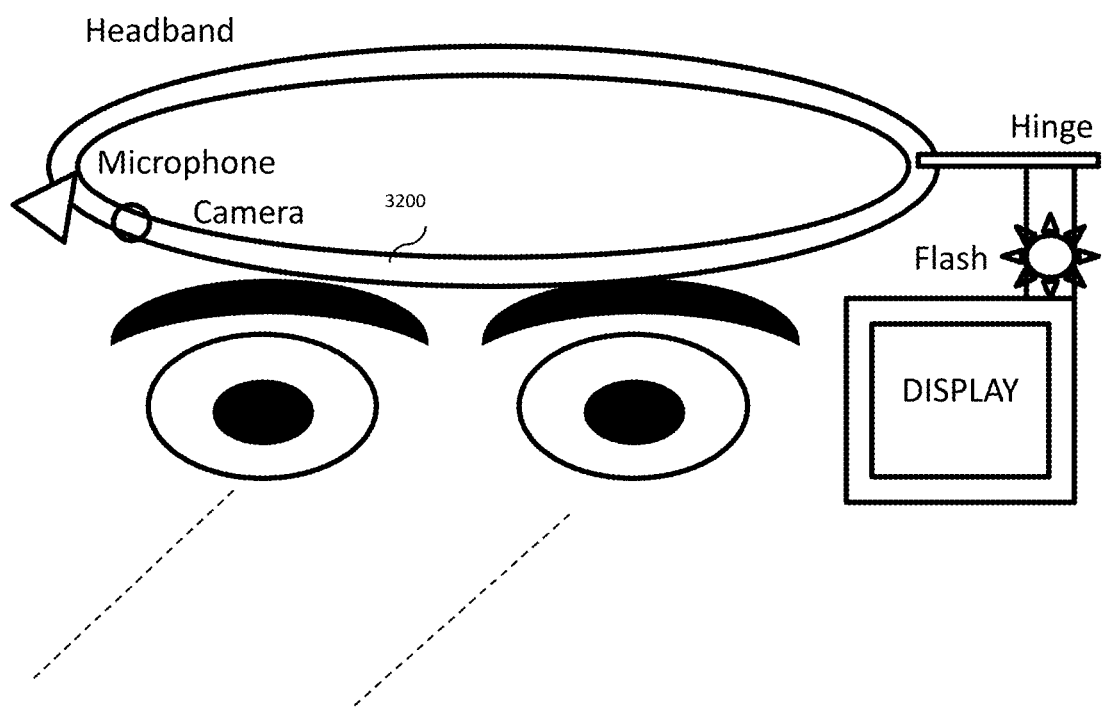
FIG. 32 shows a headset with a display, flash, camera and microphone.

Referring to FIG. 32, shows an alternative version of the headset fashioned as a headband 3200. The headband has a hinged display, flash, microphone, speaker, and camera. This headband may be more appropriate for athletes or bikers.

Figure 33:
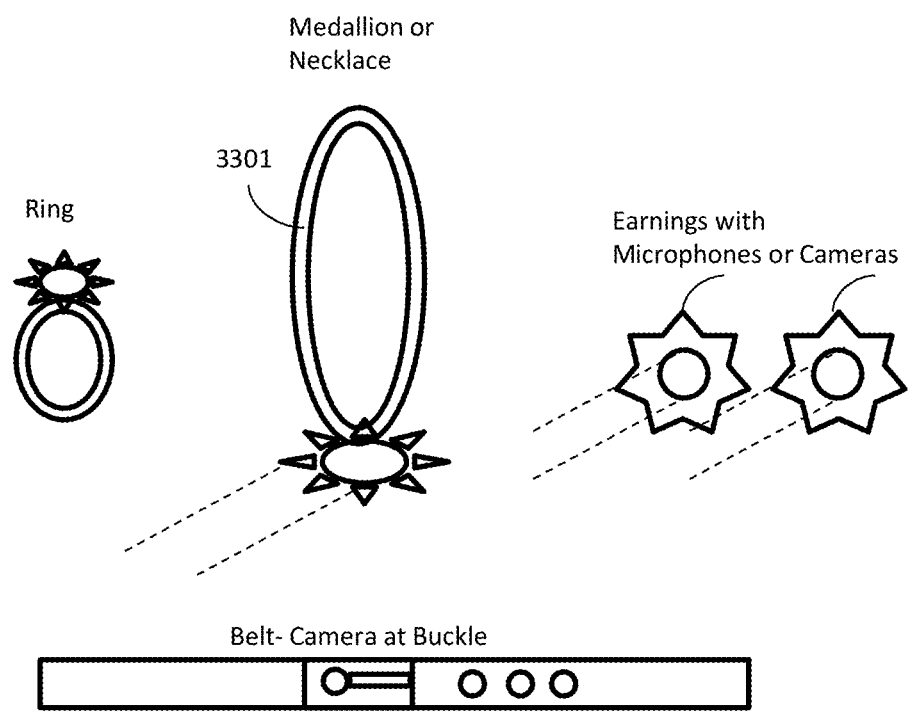
FIG. 33 shows a variety of items fashioned to be worn on the body that may contain various continuous input capture items including cameras and microphones.

Referring now to FIG. 33, a variety of fashion items including a necklace or medallion 3301, earrings, ring, or belt may be fitted with micro-cameras, antennas, wireless transmit and receive radios, battery, and memory to aid in acquiring information about the environment. Other devices may have GPS monitors or accelerometers. These devices may work together and stream data to a mobile device, glasses, or a remote server. Each device may broadcast their capabilities including megapixels for the camera, camera orientation, storage capacity, battery life, and processing power. A mobile device may prioritize the various devices for collecting inputs.

It is anticipated that the various components disclosed herein including cameras, displays, sensors, wireless T/R may be integrated into a variety of devices and environments. The disclosure herein has applicability to a variety of contexts including travel, transportation, shopping, auctions, banking, emergency services, visually impaired, crowdsourcing, peer to peer communication, video and audio conferencing, education and learning, negotiations and auditing, sports, news, and other domains.

It is further anticipated that various extensions via cases, custom watch bands, custom frame bands, add-ons, software development kits may be created to enable further use cases of the devices and systems disclosed herein. It is further enabled that the devices may be configured to enable fitness, health, lifestyle, voice commands, voice recognition, learning, and gaming activities. In certain instances these add-ons may enable the device to be used with or without a mobile device.

In yet another instance, a watch or smart glasses may be enabled with a payment profile to enable automated billing and self checkout. In these instances authentication for given person may be enabled via the use of various of wearable and mobile devices to prove that an individual is authorized to make a purchase. This may include imaging the individual using a glass device coupled to a ECG sensor from a watch device in further conjunction with a fingerprint reader in a mobile device with a payment profile.

The foregoing descriptions of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed:

1. A system comprising:
a wearable glasses device that comprises a display, a wireless transmit and receive component; and a camera;
the camera of the wearable glasses device enabled to acquire a continuous feed of images of an environment including an object;
wherein the continuous feed of images is displayed on the wireless device;
the wearable glasses device enabled to determine a movement data of the wearable glasses device;
wherein the movement data and an object data obtained from a remote server pertaining to the object is shown on the display of the wearable glasses device;
wherein the wearable glasses device is further enabled with an accelerometer, an altimeter, a gyroscope, and an infrared sensor; and
wherein the wearable glasses device is enabled to estimate the calorie and the nutritional value of the object, store consumption data in a memory, and show one or more recipes in the display of the wearable glasses device.

2. The system of claim 1, wherein the object is tracked by the wearable glasses device via the camera to determine the trajectory of the object.

3. The system of claim 2, wherein the tracking of the object is enabled such that a notification including the determined trajectory of the object appears on the display of the wearable glasses device.

4. The system of claim 3, wherein a notification is set to appear on a separate wireless device containing the trajectory of the object as determined by the wearable glasses device.

5. The system of claim 4, wherein the object is a ball.

6. A system comprising:
a wireless device comprising a display, a wireless transmit and receive component; and a camera;
the camera enabled to acquire a continuous feed of images of an environment including one or more objects;
the wireless device configured to display the continuous feed of images;
the wireless device configured to capture a movement data of the wireless device;
the wireless device configured to display the movement data and an object data pertaining to at least one of the one or more objects;
the wireless device is further enabled with an accelerometer, a proximity sensor, a gyroscope, an altimeter sensor, and an infrared sensor; and
wherein the wireless device is configured to display metrics regarding movement of the wireless device and the object on the display of the wireless device.

7. The system of claim 6, wherein a physical health parameter including a heart rate is obtained by a separate and connected wearable device and wherein the physical health parameter is shown on the display of the wireless device.

8. The system of claim 7, wherein the movement data of the wireless device including one or more of a speedometer data and a acceleration data appears in the display of the wireless device.

9. The system of claim 8, wherein the physical health parameter is related to the movement of the wireless device.

10. The system of claim 9, wherein the display is enabled to exhibit text and call information in the viewable area of the display.

11. The system of claim 6, wherein navigation and a map data is enabled to be displayed on the wireless device.

12. The system of claim 11, wherein the camera is enabled to continuously record video for a time period and send said video to a network server; and wherein the wireless device is a wearable smart glasses device.

13. A system comprising:
a wireless device comprising at least one wireless transmit and receive component, and a camera;
the camera enabled to acquire a continuous video of an environment including an object;
the wireless device configured to capture a movement data of the wireless device;
the wireless device configured to display the movement data and an object data pertaining to the object;
wherein the wireless device is enabled to display a virtual image that exhibits information pertaining to the object in the field of view of a user of the wireless device; and
wherein a second video stream inclusive is captured in real-time from a second camera on the wireless device and appears in a second lens of the wireless device.

14. The system of claim 13, wherein the object includes a food item, wherein the wireless devices performs image recognition on the food item, and further generates a report of the nutritional value of the food item based on data.

15. The system of claim 14, wherein the size of the food item is analyzed to determine a portion amount.

16. The system of claim 15, wherein the caloric count and activity level of the activity is shown on the display of the wireless device.

17. The system of claim 13, wherein the wireless device is a augmented reality enabled wearable glasses device; and wherein the wearable glasses device comprises: a see-thru display; a gesture control; an eye-tracking system; an accelerometer; and a gyroscope.

* * * * *